US012510302B2

(12) United States Patent
Choi et al.

(10) Patent No.: US 12,510,302 B2
(45) Date of Patent: Dec. 30, 2025

(54) HEAT EXCHANGER

(71) Applicant: Hanon Systems, Daejeon (KR)

(72) Inventors: Ji Hoon Choi, Daejeon (KR); Sung Hong Shin, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 221 days.

(21) Appl. No.: 18/014,921

(22) PCT Filed: Jul. 9, 2021

(86) PCT No.: PCT/KR2021/008806
§ 371 (c)(1),
(2) Date: Jan. 6, 2023

(87) PCT Pub. No.: WO2022/010313
PCT Pub. Date: Jan. 13, 2022

(65) Prior Publication Data

US 2023/0324128 A1 Oct. 12, 2023

(30) Foreign Application Priority Data

Jul. 10, 2020 (KR) ........................ 10-2020-0085035
Jul. 7, 2021 (KR) ........................ 10-2021-0088959

(51) Int. Cl.
*F28D 9/00* (2006.01)
*F28F 3/08* (2006.01)

(52) U.S. Cl.
CPC ......... *F28D 9/0093* (2013.01); *F28D 9/0037* (2013.01); *F28D 9/005* (2013.01); *F28D 9/0056* (2013.01); *F28D 9/0068* (2013.01); *F28F 3/08* (2013.01); *Y02T 10/12* (2013.01)

(58) Field of Classification Search
CPC ...... F28D 9/0093; F28D 9/0037; F28D 9/005; F28D 9/0056; F28D 9/0068; F28F 3/08; Y02T 10/12
USPC ........................................ 165/140, 166, 167
See application file for complete search history.

(56) References Cited

U.S. PATENT DOCUMENTS 1,875,128 A * 8/1932 Patterson .............. F28D 9/0068 165/145
2,472,413 A * 6/1949 Gantvoort ................. F28F 9/02 165/166
2,623,736 A * 12/1952 Larsson ............. A23B 11/1332 165/100

(Continued)

FOREIGN PATENT DOCUMENTS

JP H11510890 A 9/1999
JP 2016-090217 A 5/2016

(Continued)

OTHER PUBLICATIONS

Official Action issued Jul. 15, 2025 in related Korean Patent Application No. 10-2021-0088959, 7 pgs.

*Primary Examiner* — Ljiljana V. Ciric
(74) *Attorney, Agent, or Firm* — NORTON ROSE FULBRIGHT US LLP

(57) ABSTRACT

A heat exchanger is formed to enable three types of fluids to undergo heat exchange with each other. The heat exchanger is formed so that two types of coolants having different temperature ranges, such as a coolant for cooling a battery and a coolant for cooling a motor, and one type of refrigerant in an electric vehicle may undergo heat exchange by means of one heat exchanger.

16 Claims, 22 Drawing Sheets

(56) References Cited

U.S. PATENT DOCUMENTS

| | | | | |
|---|---|---|---|---|
| 3,399,708 | A * | 9/1968 | Usher | F28F 13/08 165/165 |
| 3,532,161 | A * | 10/1970 | Loebel | F28F 3/046 165/140 |
| 3,610,332 | A * | 10/1971 | Takayasu | F28D 9/0037 126/90 R |
| 4,002,201 | A * | 1/1977 | Donaldson | F28F 3/04 165/166 |
| 4,081,025 | A * | 3/1978 | Donaldson | F28F 3/04 165/140 |
| 4,249,597 | A * | 2/1981 | Carey | F28D 9/005 165/70 |
| 4,742,866 | A * | 5/1988 | Yamanaka | F16N 39/02 165/283 |
| 4,872,578 | A * | 10/1989 | Fuerschbach | F28D 9/005 165/166 |
| 5,042,577 | A * | 8/1991 | Suzumura | F28D 1/0333 165/176 |
| 5,099,913 | A * | 3/1992 | Kadle | B60H 1/00335 62/526 |
| 5,180,004 | A * | 1/1993 | Nguyen | B60H 1/3227 165/135 |
| 5,409,058 | A * | 4/1995 | Yuasa | F28D 9/005 165/140 |
| 5,462,113 | A * | 10/1995 | Wand | F28D 9/0093 165/140 |
| 5,720,341 | A * | 2/1998 | Watanabe | F28D 1/024 165/135 |
| 5,896,834 | A * | 4/1999 | Gruner | F28D 9/0093 123/196 AB |
| 5,927,396 | A * | 7/1999 | Damsohn | F28D 9/0093 165/135 |
| 6,044,902 | A * | 4/2000 | Pahade | F28D 9/0068 165/165 |
| 6,244,334 | B1 * | 6/2001 | Wu | F28D 9/005 165/166 |
| 6,250,380 | B1 * | 6/2001 | Strahle | F28D 9/0043 165/166 |
| 6,293,338 | B1 * | 9/2001 | Chapman | F28F 3/04 165/170 |
| 6,318,455 | B1 * | 11/2001 | Nakado | F28F 3/044 165/DIG. 464 |
| 6,340,053 | B1 * | 1/2002 | Wu | F28F 3/027 165/140 |
| 6,357,113 | B1 * | 3/2002 | Williams | B23P 15/26 29/890.034 |
| 6,502,420 | B2 * | 1/2003 | Gupte | F28F 3/046 165/140 |
| 6,530,425 | B2 * | 3/2003 | Wehrmann | F28D 9/0093 165/166 |
| 6,564,862 | B1 * | 5/2003 | Persson | F28D 9/0093 165/140 |
| 6,574,427 | B1 * | 6/2003 | Andersson | F24D 11/002 392/496 |
| D485,535 | S * | 1/2004 | Niwatsukino | D13/179 |
| D486,455 | S * | 2/2004 | Niwatsukino | D13/179 |
| 6,705,392 | B2 * | 3/2004 | Gotou | F28D 9/0093 165/166 |
| 6,863,120 | B2 * | 3/2005 | Hwang | F28F 3/044 165/174 |
| 6,948,559 | B2 * | 9/2005 | Reinke | F28D 9/005 165/140 |
| 6,953,081 | B2 * | 10/2005 | Klingler | F28F 17/005 165/130 |
| 6,973,804 | B2 * | 12/2005 | Horiuchi | F28F 1/022 165/110 |
| 6,973,961 | B2 * | 12/2005 | Rehberg | F28F 3/046 165/70 |
| 7,051,799 | B2 * | 5/2006 | Wu | F28D 9/0012 165/167 |
| 7,213,635 | B2 * | 5/2007 | Persson | F28F 9/0075 165/906 |
| 7,264,045 | B2 * | 9/2007 | Mehendale | F28D 1/0341 165/170 |
| 7,380,544 | B2 * | 6/2008 | Raduenz | F28D 9/0056 165/166 |
| 7,451,807 | B2 * | 11/2008 | Persson | B01D 53/265 165/114 |
| 7,690,420 | B2 * | 4/2010 | Horte | F28D 9/005 165/167 |
| 7,775,264 | B2 * | 8/2010 | Andersson | F28D 9/005 165/167 |
| 7,946,339 | B2 * | 5/2011 | So | F28D 1/0461 165/140 |
| 8,220,529 | B2 * | 7/2012 | Kim | F28D 9/0093 122/235.16 |
| 8,550,153 | B2 * | 10/2013 | Yin | F28F 3/025 165/146 |
| 8,733,427 | B2 * | 5/2014 | So | F28D 1/0333 165/140 |
| 8,869,398 | B2 * | 10/2014 | Kent | B21D 53/04 29/890.03 |
| 8,925,624 | B2 * | 1/2015 | Kuroyanagi | F28D 7/1692 165/157 |
| 8,943,854 | B2 * | 2/2015 | Persson | F28F 9/028 62/468 |
| 9,038,609 | B2 * | 5/2015 | Meshenky | F02M 35/10242 60/599 |
| 9,091,494 | B2 * | 7/2015 | Dahlberg | F28F 17/005 |
| 9,233,197 | B2 * | 1/2016 | Jönsson | F28D 9/0056 |
| 9,234,604 | B2 * | 1/2016 | Kim | F28D 9/0093 |
| 9,322,319 | B2 * | 4/2016 | Kim | F28F 27/02 |
| 9,343,755 | B2 * | 5/2016 | Vanderwees | H01M 8/04141 |
| 9,429,367 | B2 * | 8/2016 | Jouanny | F28D 9/005 |
| 9,683,786 | B2 * | 6/2017 | Barwig | F28D 9/0062 |
| 9,856,778 | B2 * | 1/2018 | Tokozakura | F28D 9/0093 |
| 9,897,389 | B2 * | 2/2018 | Denoual | F28D 9/0056 |
| 9,957,879 | B2 * | 5/2018 | Tokozakura | F28D 9/0093 |
| 10,006,311 | B2 * | 6/2018 | Yin | F02M 26/28 |
| 10,215,496 | B2 * | 2/2019 | De Vos | F28D 7/0008 |
| 10,365,045 | B2 * | 7/2019 | Choi | F02M 21/06 |
| 10,591,220 | B2 * | 3/2020 | Bluetling | F28D 9/0093 |
| 10,605,534 | B2 * | 3/2020 | Persson | F28F 9/026 |
| 11,289,752 | B2 * | 3/2022 | Shisler | F28F 3/046 |
| 11,300,366 | B2 * | 4/2022 | Dahlberg | F28D 9/005 |
| 11,656,032 | B2 * | 5/2023 | Yang | H01M 8/10 165/178 |
| 11,703,262 | B2 * | 7/2023 | Vetter | B60H 1/00342 62/181 |
| 11,959,706 | B2 * | 4/2024 | Tissot | F28F 3/048 |
| 12,140,387 | B2 * | 11/2024 | Dahlberg | F28D 9/005 |
| 2001/0018968 | A1 * | 9/2001 | Klingler | F28F 3/025 165/140 |
| 2003/0047303 | A1 * | 3/2003 | Andersson | F28F 3/10 165/140 |
| 2004/0159424 | A1 * | 8/2004 | Reinke | F28F 13/08 165/140 |
| 2006/0266501 | A1 * | 11/2006 | So | F28D 1/0461 165/140 |
| 2007/0125527 | A1 * | 6/2007 | Flik | F28D 7/1692 165/140 |
| 2007/0267000 | A1 * | 11/2007 | Raduenz | F02M 26/32 165/158 |
| 2011/0083833 | A1 | 4/2011 | Zorzin et al. | |
| 2013/0244077 | A1 * | 9/2013 | Palanchon | H01M 10/61 429/120 |
| 2017/0254597 | A1 | 9/2017 | Renz et al. | |
| 2024/0337451 | A1 * | 10/2024 | Granryd | F28F 13/04 |

FOREIGN PATENT DOCUMENTS

| | | | |
|---|---|---|---|
| JP | 6177459 | B1 | 8/2017 |
| JP | 2020079693 | B1 | 5/2020 |
| KR | 1999-0044058 | A | 6/1999 |
| KR | 101263559 | B2 | 5/2013 |
| KR | 20140083227 | A | 7/2014 |
| KR | 20150043745 | B4 | 4/2015 |
| KR | 101545648 | B1 | 8/2015 |
| KR | 20170055980 | B3 | 5/2017 |

(56) References Cited

FOREIGN PATENT DOCUMENTS

| | | | | | |
|---|---|---|---|---|---|
| KR | 20180060262 A | * | 6/2018 | ................ | F28F 3/02 |
| SE | 9800783 A | * | 2/1999 | ............. | F28D 9/005 |
| WO | WO-0167021 A1 | * | 9/2001 | ............. | F28D 9/005 |

* cited by examiner

HEAT EXCHANGER

CROSS REFERENCE TO RELATED APPLICATIONS

This application is a national phase under 35 U.S.C. § 371 of International Application No. PCT/KR2021/008806 filed on Jul. 9, 2021, which claims the benefit of priority from Korean Patent Application Nos. 10-2021-0088959 filed on Jul. 7, 2021 and 10-2020-0085035 filed on Jul. 10, 2020. The entire contents of these applications are incorporated herein by reference in their entirety.

TECHNICAL FIELD

The present invention relates to a heat exchanger, and more particularly, a heat exchanger in which two different types of fluids and one other type of fluid may exchange heat with each other, that is, as a result, three types of fluids may exchange heat with each other.

BACKGROUND ART

In general, an engine room of a vehicle may be provided with not only components for driving the vehicle, such as an engine, but also various heat exchangers such as a radiator, an intercooler, an evaporator, and a condenser for cooling the respective components in the vehicle, such as the engine, or for adjusting an air temperature of a vehicle interior. A heat exchange medium may circulate in these heat exchangers, and cooling or heat dissipation may be achieved by exchanging heat between the heat exchange medium in the heat exchanger and air outside the heat exchanger. The heat exchanger in which one type of heat exchange medium exchanges heat with outside air may also be referred to as an air-cooled heat exchanger.

In many cases, one type of heat exchange medium circulates in the heat exchanger. However, when necessary, heat exchangers in which two types of heat exchange media circulate may be integrally formed with each other. For example, in cases of the radiator and oil cooler of an automobile, a coolant for cooling the engine may circulate in the radiator, and oil such as engine oil or transmission oil may circulate in the oil cooler. In some cases, these components may be formed as separate devices. However, in many cases, these components may be formed integrally with each other for increasing space utilization in the engine room, or for introducing a water-cooled oil cooler structure in which the coolant is used to cool the oil, etc. When two types of heat exchange media circulate, the two types of heat exchange media may also respectively be cooled by exchanging heat with outside air, and this case may also correspond to an air-cooled heat exchanger. On the other hand, two types of heat exchange media may also exchange heat with each other, and in particular, when one of the two types of heat exchange media is a coolant, this case may also be referred to as a water-cooled heat exchanger. There are various examples of heat exchangers in which two types of heat exchange media exchange heat with each other. The heat exchanger may be a heat exchanger in which a structure through which the other type of heat exchange medium flows such as a pipe is simply inserted into a space where one type of heat exchange medium flows, a plate heat exchanger in which different types of heat exchange media flow in respective layers for heat exchange to be achieved at a boundary of the respective layers, or the like.

Korean Pat. No. 1545648 ("PLATE-TYPE HEAT EXCHANGER", published on Aug. 12, 2015, hereinafter referred to as 'prior art') discloses heat exchanger technology in which two types of heat exchange media circulate and exchange heat with each other. FIG. 1 is an exploded perspective view of a prior two-type fluid heat exchanger. As shown in FIG. 1, the plate heat exchanger may include two types of plates alternately stacked, and four inlets and outlets for two different types of fluids as shown in FIG. 1 as a 'refrigerant' and a 'coolant' to flow in and out respectively. In an example of FIG. 1, first and second plates 500 *a* and 500 *b* may be all recessed downward to form a fluid circulation space. In the first plate 500 *a*, edges of communication holes 510 and 520 connected with the refrigerant inlet and the refrigerant outlet may protrude to an opposite side of the fluid circulation space, that is, protrude downward, and edges of communication holes 530 and 540 connected with the coolant inlet and the coolant outlet may protrude to the fluid circulation space, that is, protrude upward. The communication holes in the second plate 500 *b* may each have a structure opposite thereto. When the second plate 500 *b* and the first plate 500 *a* are sequentially stacked, the edges of the communication holes 530 and 540 positioned adjacent to the coolant inlet and the coolant outlet of the lower first plate 500 *a* may protrude upward, the edges of the communication holes 530 and 540 positioned adjacent to the coolant inlet and the coolant outlet of the upper second plate 500 *b* may protrude downward, and these edges may come into contact with each other. Accordingly, the coolant is prevented from flowing into a space formed by sequentially stacking the second plate 500 *b* and the first plate 500 *a*, that is, a space where a fluid is indicated to circulate along thick arrows in FIG. 1 (because the edges of the communication holes positioned adjacent to the coolant inlet and the coolant outlet come into contact with each other to be blocked), and only a refrigerant may circulate in the corresponding space. On the other hand, when the first plate 500 *a* and the second plate 500 *b* are sequentially stacked, only the coolant may circulate in a space formed by sequentially stacking the first plate 500 *a* and the second plate 500 *b*, that is, a space where a fluid is indicated to circulate along light arrows in FIG. 1. As described above, in the plate heat exchanger, the first and second plates 500 *a* and 500 *b* may be alternately stacked, and as a result, a refrigerant circulation space and a coolant circulation space may be alternately stacked. Therefore, the coolant and the refrigerant may exchange heat with each other through a plate surface. The heat exchanger cooling the refrigerant by exchanging heat between the coolant and the refrigerant in this way may be particularly referred to as a chiller. As shown in the example of FIG. 1, one type of coolant and one type of refrigerant may exchange heat with each other in a general chiller.

Meanwhile, in recent years, a regulation on an internal combustion engine vehicle have become stricter as an environmental pollution problem has become increasingly serious, and some countries are expected to prohibit production of the internal combustion engine vehicle itself within the next few decades. Accordingly, demand for a hybrid or electric vehicle is greatly increasing, and related research is also being actively conducted.

The electric vehicle may be basically moved by driving a motor by using electric power stored in a battery. Here, considerable heat may occur in the battery or the motor, and a structure to cool the battery and the motor with the coolant is introduced and used, similar to cooling the engine with the coolant in the internal combustion engine vehicle. Here, an amount of heat occurring in the battery and that occurring in the motor may be different from each other. Accordingly, a temperature of the coolant that becomes higher by cooling the battery, and a temperature of the coolant that becomes higher by cooling the motor may be different from each other. The chiller described above is a heat exchanger that performs cooling by allowing the high-temperature coolant to exchange heat with the refrigerant. However, if a severe difference exists in a temperature range between the two types of coolants (i.e., coolant for cooling a battery and coolant for cooling a motor), the chiller may have lower cooling efficiency because the cooled coolant may not provide a low enough temperature to be reused as a coolant for relatively low-temperature parts when the coolants are simply mixed with each other and cooled by one chiller.

The simplest method as a solution for solving this problem may be a method of separately providing a chiller for a battery and a chiller for a motor. However, this method requires two chillers, which may result in numerous problems such as significantly lower space utilization in the engine room, lower system efficiency caused by an increased vehicle weight, and increased equipment complexity and leakage risk that are caused by distributing and supplying the refrigerant to two chillers.

Therefore, it is urgent to develop a heat exchanger structure in which heat may be exchanged between three types of heat exchange media by means of one heat exchanger, in particular, heat may be exchanged between two types of fluids (here, if the media have different temperature ranges although the media itself are the same coolants as each other, these media may be classified as two types, and in the above example, the media correspond to the coolant for cooling a battery and the coolant for cooling a motor) and one other type of fluid (corresponding to the refrigerant in the above example).

RELATED ART DOCUMENT

Patent Document (Patent Document 1) 1. Korean Patent No. 1545648 ("plate-type heat exchanger", published on Aug. 12, 2015)

DISCLOSURE

Technical Problem

An object of the present invention is to provide a heat exchanger in which two different types of fluids and one other type of fluid may exchange heat with each other, that is, as a result, three types of fluids may exchange heat with each other. More specifically, the object of the present invention is to provide a heat exchanger in which two types of coolants having different temperature ranges, such as a coolant for cooling a battery and a coolant for cooling a motor, and one type of refrigerant in an electric vehicle may exchange heat by means of one heat exchanger for example.

Technical Solution

In a first or second embodiment, a heat exchanger 100A or 100B which is a plate heat exchanger formed by stacking a plurality of plates, includes: a first plate 110A or 110B including a first flow part V1 through which a first fluid flows; and a second plate 120A or 120B including a second flow part V2 partitioned by a partition wall 125 into one side and the other side in a length direction for a second fluid and a third fluid to flow therethrough while being isolated from each other, wherein the first plate 110A or 110B and the second plate 120A or 120B are alternately stacked.

Here, the partition wall 125 may have at least one partition wall hole 125H positioned in its surface joined to the adjacent first plate 110A or 110B.

In the first embodiment, the heat exchanger 100A may have a first inlet hole H1 and a first outlet hole H2 through which the first fluid is introduced and discharged, respectively, and the first inlet hole H1 and the first outlet hole H2 may be disposed at both ends in the length direction while being spaced apart from each other in the length direction.

In addition, the heat exchanger 100A may have a fluid distribution structure for distributing the flow of the first fluid by protruding toward the first flow part V1 from an imaginary connection line between the first inlet hole H1 and the first outlet hole H2.

In addition, the fluid distribution structure may have a protruding area becoming smaller as being closer to the first inlet hole H1 or the first outlet hole H2. In more detail, the fluid distribution structure may have a protruding part formed in a triangular shape or a circular arc shape.

In addition, the fluid distribution structure may be positioned not to correspond to the partition wall 125 positioned on the second plate 120A.

In addition, in the heat exchanger 100A, the first inlet hole H1 and the first outlet hole H2 may be disposed at a center in a width direction.

In Embodiment 1-1, the heat exchanger 100A may have a second inlet hole H3 and a second outlet hole H4 through which the second fluid is introduced and discharged, respectively, and a third inlet hole H5 and a third outlet hole H6 through which the third fluid is introduced and discharged, respectively, and the second inlet hole H3 and the second outlet hole H4 may be disposed in one end in the length direction while being spaced apart from each other in the width direction, and the third inlet hole H5 and the third outlet hole H6 may be disposed in the other end in the length direction while being spaced apart from each other in the width direction.

Here, the fluid distribution structure may be a pair of half-moon ribs 112A positioned on a center of the first plate 110A, having a half-moon shape in which its side adjacent to the first inlet hole H1 or the first outlet hole H2 is a circular arc, and its central side is a straight line, and spaced apart from each other not to correspond to the partition wall 125 positioned on the adjacent second plate 120A.

In addition, the heat exchanger 100A may include a second guide wall 121A extending from one side wall of the second plate 120A in the length direction to partition the second inlet hole H3 and the second outlet hole H4 in the second plate 120A from each other and a third guide wall 122A extending from the other side wall of the second plate 120A in the length direction to partition the third inlet hole H5 and the third outlet hole H6 in the second plate 120A from each other.

In Embodiment 1-2, the heat exchanger 100A may have a second inlet hole H3 and a second outlet hole H4 through which the second fluid is introduced and discharged, respectively, and a third inlet hole H5 and a third outlet hole H6 through which the third fluid is introduced and discharged, respectively, and the second inlet hole H3 and the second outlet hole H4 may be biased to one side from a center in the length direction while being spaced apart from each other in a width direction, and the third inlet hole H5 and the third outlet hole H6 may be biased to the other side from the center in the length direction while being spaced apart from each other in the width direction.

Here, the fluid distribution structure may be a pair of triangular ribs 113A positioned adjacent to the first inlet hole H1 or the first outlet hole H2, and having a triangular shape in which its side adjacent to the first inlet hole H1 or the first outlet hole H2 is a vertex and its central side is a straight line.

In addition, the heat exchanger 100A may include a second guide wall 121A extending from the partition wall 125 in the length direction to partition the second inlet hole H3 and the second outlet hole H4 in the second plate 120A from each other and a third guide wall 122A extending from the partition wall 125 in the length direction to partition the third inlet hole H5 and the third outlet hole H6 in the second plate 120A from each other.

In addition, the heat exchanger 100A may include a plurality of beads arranged on the first plate 110A and the second plate 120A.

Here, in the heat exchanger 100A, bead density on the first plate 110A may be lower than the bead density on the second plate 120A.

In addition, in the heat exchanger 100A, the beads arranged on the first plate 110A and the beads arranged on the second plate 120A may be misaligned with each other.

In the second embodiment, the heat exchanger 100B may have a first inlet hole H1 and a first outlet hole H2 through which the first fluid is introduced and discharged, respectively, and the first inlet hole H1 and the first outlet hole H2 may be positioned in any one selected from one side and the other side in the length direction partitioned by the partition wall 125.

In addition, in the heat exchanger 100B, the first fluid, the second fluid, and the third fluid may all flow while each forming a U flow.

In addition, in the heat exchanger 100B, the first inlet hole H1 and the first outlet hole H2 may be disposed in one end in the length direction while being spaced apart from each other in the width direction, and a first guide wall 111B may extend in the length direction from one side wall of the first plate 110B to the middle to partition the first inlet hole H1 and the first outlet hole H2 in the first plate 110B from each other.

In addition, the heat exchanger 100B may have a second inlet hole H3 and a second outlet hole H4 through which the second fluid is introduced and discharged, respectively, and a third inlet hole H5 and a third outlet hole H6 through which the third fluid is introduced and discharged, respectively, and the second inlet hole H3 and the second outlet hole H4 may be disposed in the other end in the length direction while being spaced apart from each other in the width direction, and the third inlet hole H5 and the third outlet hole H6 may be disposed in the middle in the length direction while being spaced apart from each other in the width direction, and the heat exchanger 100B may include a second guide wall 121B extending in the length direction from the other side wall of the second plate 120B to the middle to partition the second inlet hole H3 and the second outlet hole H4 in the second plate 120B from each other, and a third guide wall 122B extending in the length direction from the partition wall 125 to the middle to partition the third inlet hole H5 and the third outlet hole H6 in the second plate 120B from each other.

In the third embodiment, a heat exchanger 100B which is a plate heat exchanger formed by stacking a plurality of plates, includes: a first plate 110C including a first flow part V1 through which a first fluid flows; a second plate 120C including a second flow part V2 through which any one selected from a second fluid and a third fluid flows; and a diaphragm plate 130 including the second flow part V2 and blocking circulation of the second or third fluid in a stack direction of the plates, wherein the first plate 110C and the second plate 120C are alternately stacked, and one of the stacked second plates 120C is replaced by the diaphragm plate 130, thus enabling the first and second fluids to circulate in one side, and the first and third fluids to circulate in the other side, based on position of the diaphragm plate 130.

Here, the first plate 110C or the second plate 120C may have a first inlet hole H1 and a first outlet hole H2 through which the first fluid is introduced and discharged, respectively, and a second inlet hole H3 and a second outlet hole H4 through which the second fluid or the third fluid is introduced and discharged, respectively.

In addition, in the heat exchanger 100C, the first inlet hole H1 and the first outlet hole H2 may be disposed in one end in a length direction while being spaced apart from each other in a width direction, and the second inlet hole H3 and the second outlet hole H4 may be disposed in the other end in the length direction while being spaced apart from each other in the width direction.

In addition, in the heat exchanger 100C, a first guide wall 111C may extend in the length direction from one side wall of the first plate 110C to the middle to partition the first inlet hole H1 and the first outlet hole H2 in the first plate 110C from each other.

In addition, in the heat exchanger 100C, a second guide wall 121C may extend in the length direction from the other side wall of the second plate 120C to the middle to partition the second inlet hole H3 and the second outlet hole H4 in the second plate 120C from each other.

In addition, in the heat exchanger 100C, a diaphragm guide wall 131 may extend in the length direction from the other side wall of the diaphragm plate 130 to the middle to partition position of the second inlet hole H3 and position of the second outlet hole H4 in the diaphragm plate 130 from each other.

In all the embodiments, the heat exchanger 100A, 100B, or 100C may be positioned in an electric vehicle or a hybrid vehicle, and the first fluid may be a refrigerant, one of the second and the third fluid may be a coolant for cooling a battery, and the other may be a coolant for cooling a motor.

Advantageous Effect

The present invention may provide the heat exchanger in which the two different types of fluids and one other type of fluid exchange heat with each other, that is, as a result, three types of fluids exchange heat with each other by means of one heat exchanger. Conventionally, in order to perform the heat exchange between these three types of fluids while preventing the lower cooling efficiency or system efficiency, it is necessary to separately provide two heat exchangers, that is, one heat exchanger that exchanges heat between one of the two fluids and one other type of fluid, and the other heat exchanger that exchanges heat between the other one of the two fluids and one other type of fluid. As a result, numerous problems occur such as the lower space utilization in the engine room, the lower system efficiency caused by the increased vehicle weight, and the increased device complexity and leakage risk that are caused by the distribution and supply of the refrigerant. However, according to the present invention, these problems may be fundamentally eliminated by enabling three types of fluids to exchange heat with each other by means of one heat exchanger.

In particular, this structure may be used as the chiller for an electric vehicle to maximize its utilization. In the electric vehicle, the coolant for cooling a battery and the coolant for cooling a motor may have the different temperature ranges, and it may thus be difficult to simultaneously cool the two types of coolants in the chiller that cools the coolant by using the refrigerant. Meanwhile, in the heat exchanger of the present invention, two different fluids and one other type of fluid may exchange heat with each other, and the heat exchanger of the present invention may thus be very suitable to be used as the chiller. That is, when the heat exchanger of the present invention is applied, the coolant for cooling a battery and the coolant for cooling the motor may circulate through separate inlets and outlets positioned on one heat exchanger, and respectively perform the independent heat exchange with the refrigerant circulating through other separate inlets and outlets.

DESCRIPTION OF REFERENCE NUMERALS

Figure 1:
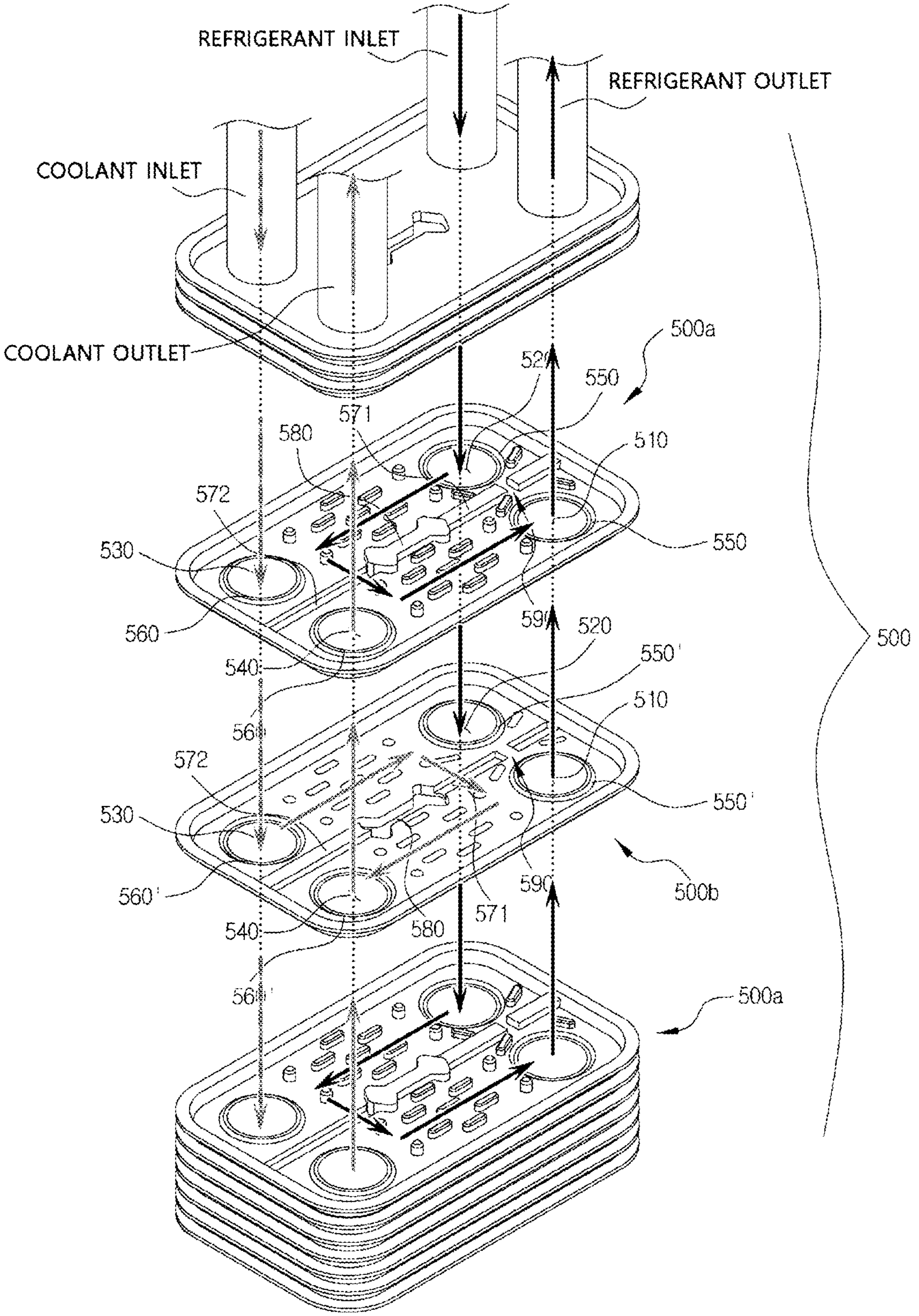
FIG. 1 is an exploded perspective view of a prior two-type fluid heat exchanger.

100A: heat exchanger (in first embodiment)
110A: first plate
111A: first guide wall
112A: half-moon rib
113A: triangular rib
120A: second plate
125: partition wall
121A: second guide wall
122A: third guide wall
125H: partition wall hall
100B: heat exchanger (in second embodiment)
110B: first plate
111B: first guide wall
120B: second plate
125: partition wall
121B: second guide wall
122B: third guide wall
141: first fluid inlet
142: first fluid outlet
143: second fluid inlet
144: second fluid outlet
145: third fluid inlet
146: third fluid outlet
100C: heat exchanger (in third embodiment)
110C: first plate
111C: first guide wall
120C: second plate
121C: second guide wall
130: diaphragm plate
131: diaphragm guide wall
141: first fluid inlet
142: first fluid outlet
143: second fluid inlet
144: second fluid outlet
145: third fluid inlet
146: third fluid outlet
H1: first inlet hole
H2: first outlet hole
H3: second inlet hole
H4: second outlet hole
H5: third inlet hole
H6: third outlet hole
R1, R1': first junction part
R2, R2': second junction part
R3, R3': third junction part

BEST MODE

Hereinafter, a heat exchanger of the present invention that has the above-described configuration is described in detail with reference to the accompanying drawings.

[1] Heat Exchanger of Present Invention

The heat exchanger of the present invention may be a plate heat exchanger in which spaces where fluids circulate to exchange heat with each other are alternately stacked in a height direction, which is basically similar to the two-type fluid heat exchanger in the prior art described above with reference with FIG. 1. In more detail, in the prior two-type fluid heat exchanger, the space where a first fluid circulates and a space where a second fluid circulates may be alternately stacked in the height direction for the first fluid and the second fluid to exchange heat with each other. The heat exchanger of the present invention is intended to allow the first fluid and the second fluid to exchange heat with each other and the first fluid and a third fluid to exchange heat with each other by means of one device. To this end, to roughly explain, the heat exchanger of the present invention may partition the prior two-type fluid heat exchanger in the length or height direction to allow the second fluid to circulate in one partitioned part as in the prior art, and the third fluid instead of the second fluid to circulate in a remaining part. In this way, the first fluid and the second fluid may exchange heat with each other in one partitioned part, and the first fluid and the third fluid may exchange heat with each other in the remaining part. Accordingly, three types of fluids may simultaneously exchange heat with each other in one heat exchanger.

As described above, this heat exchanger may be very useful in an electric vehicle or a hybrid vehicle where coolants in different temperature ranges are generated. That is, in the heat exchanger, the first fluid may be a refrigerant, the second fluid may be a coolant, and the third fluid may be a coolant in a temperature range different from that of the second fluid. In more detail, the heat exchanger may be positioned in the electric vehicle or the hybrid vehicle, and one of the second fluid and the third fluid may be a coolant for cooling a battery, and the other may be a coolant for cooling a motor. As described above, the prior art requires separate chillers to separately cool the coolants in different temperature ranges, which may result in numerous problems such as significantly lower space utilization in an engine room, lower system efficiency caused by an increased vehicle weight, and increased device complexity and leakage risk that are caused by distribution and supply of the refrigerant. However, according to the present invention, these problems may be fundamentally eliminated by enabling three types of fluids to exchange heat with each other by means of one heat exchanger.

In detail, as in the two-type fluid heat exchanger described in the prior art with reference to FIG. 1, the heat exchanger of the present invention may also include a plurality of beads protruding upward or downward from the plate to form a turbulent flow when the fluid flows. It is a well-known fact that heat exchange performance may be improved by forming the turbulent flow by these beads, and the heat exchange performance may be further improved by making various modifications to the bead shape, arrangement shape, arrangement density, etc. Meanwhile, drawings for showing the following embodiments omit the beads for simplicity of the drawings. However, the present invention is not limited thereto. The purpose and structure of forming the beads are well known in a heat exchanger technology field as described above, and various prior studies thereon are conducted as described above. Therefore, it is apparent that a configuration for forming the beads may be employed in the heat exchanger of the present invention.

A heat exchanger according to a first or second embodiment of the present invention may include a partition of the second and third fluids made in the length direction, and a heat exchanger according to a third embodiment may include the partition of the second and third fluids made in the height direction. The description first describes a common matter in the first, second, and third embodiments, that is, strictly speaking, a part having a structure similar to that of the prior two-type fluid heat exchanger before respectively describing the first or second embodiment in which the partition is positioned in the length direction and the third embodiment in which the partition is positioned in the height direction below.

Figure 15:
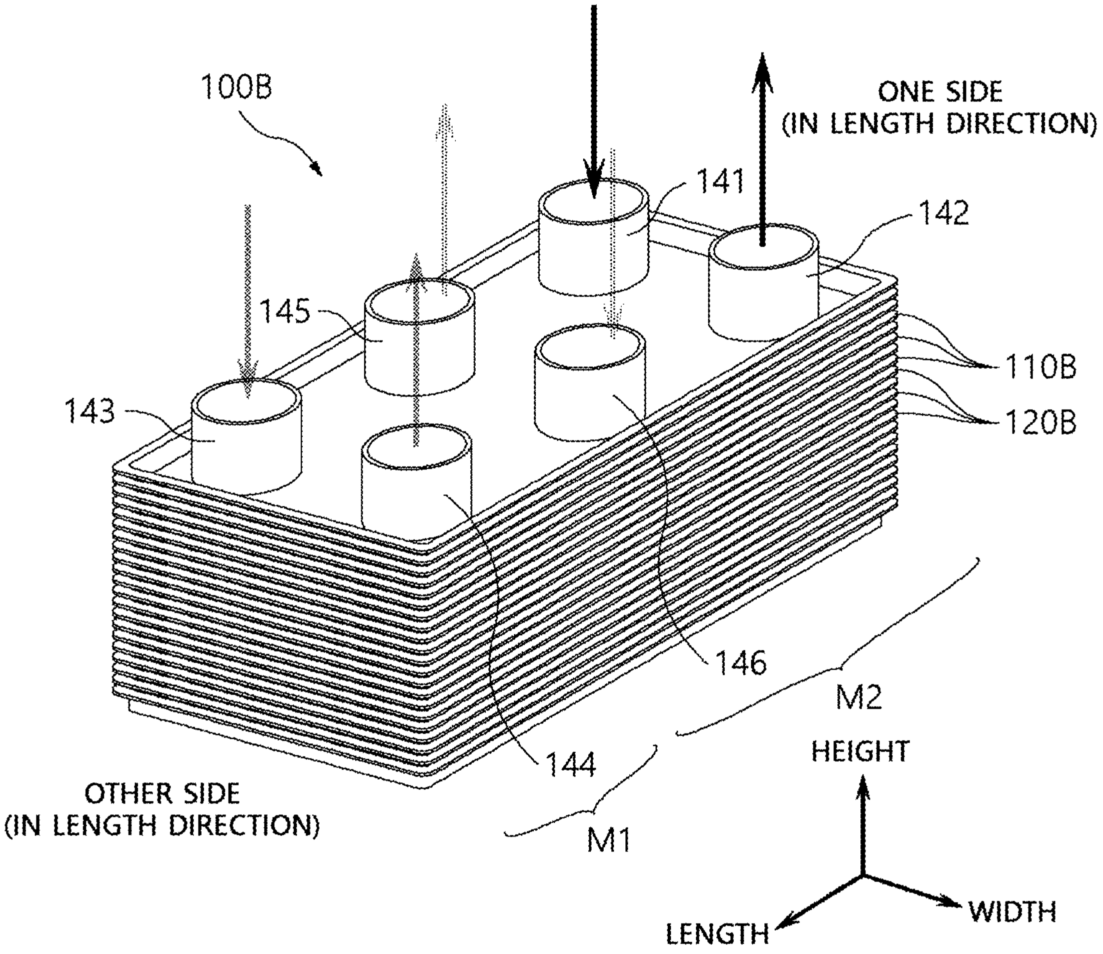
FIG. 15 is an assembled perspective view of a heat exchanger according to a second embodiment of the present invention.
Figure 16:
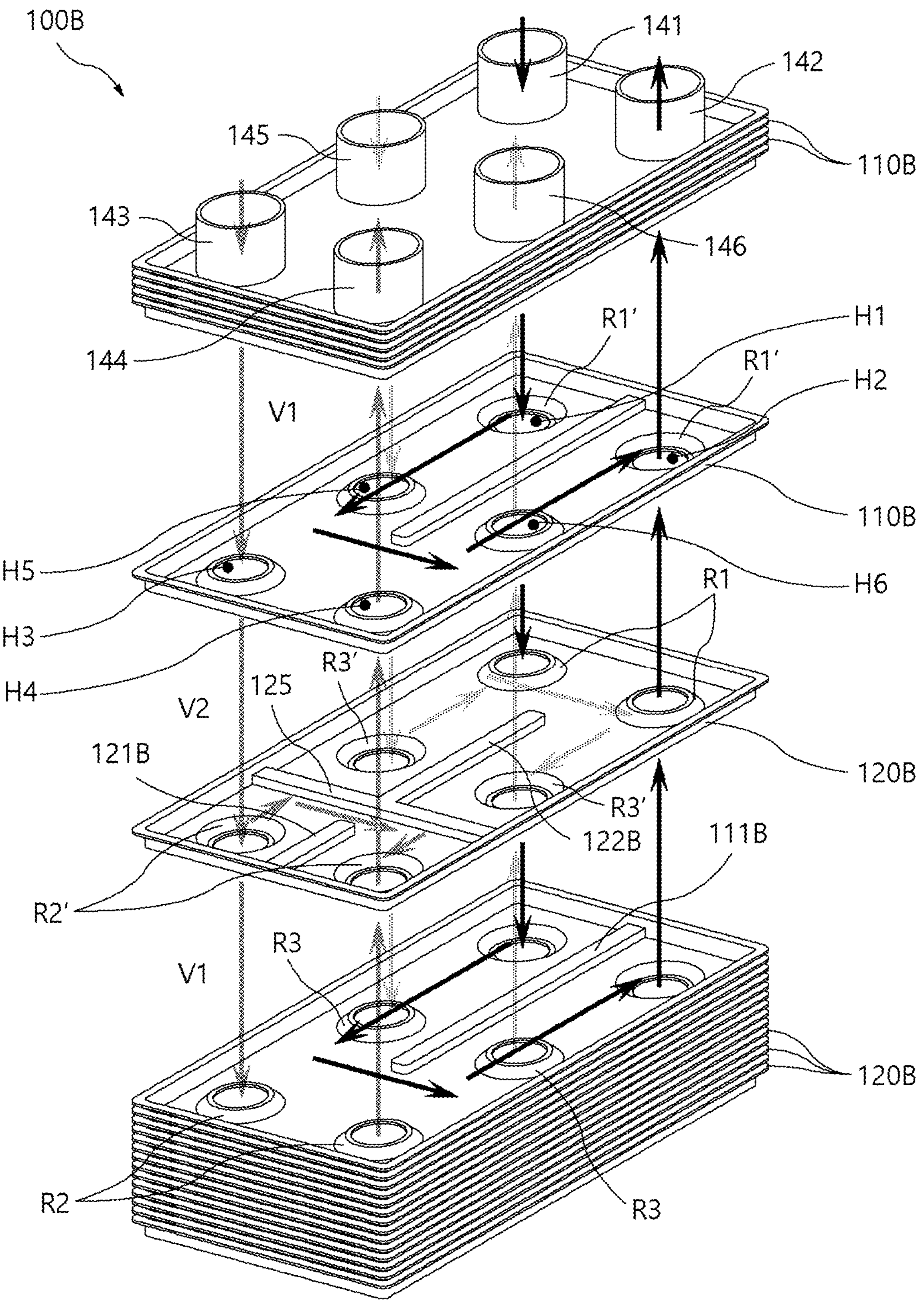
FIG. 16 is an exploded perspective view of the heat exchanger according to the second embodiment of the present invention.
Figure 17:
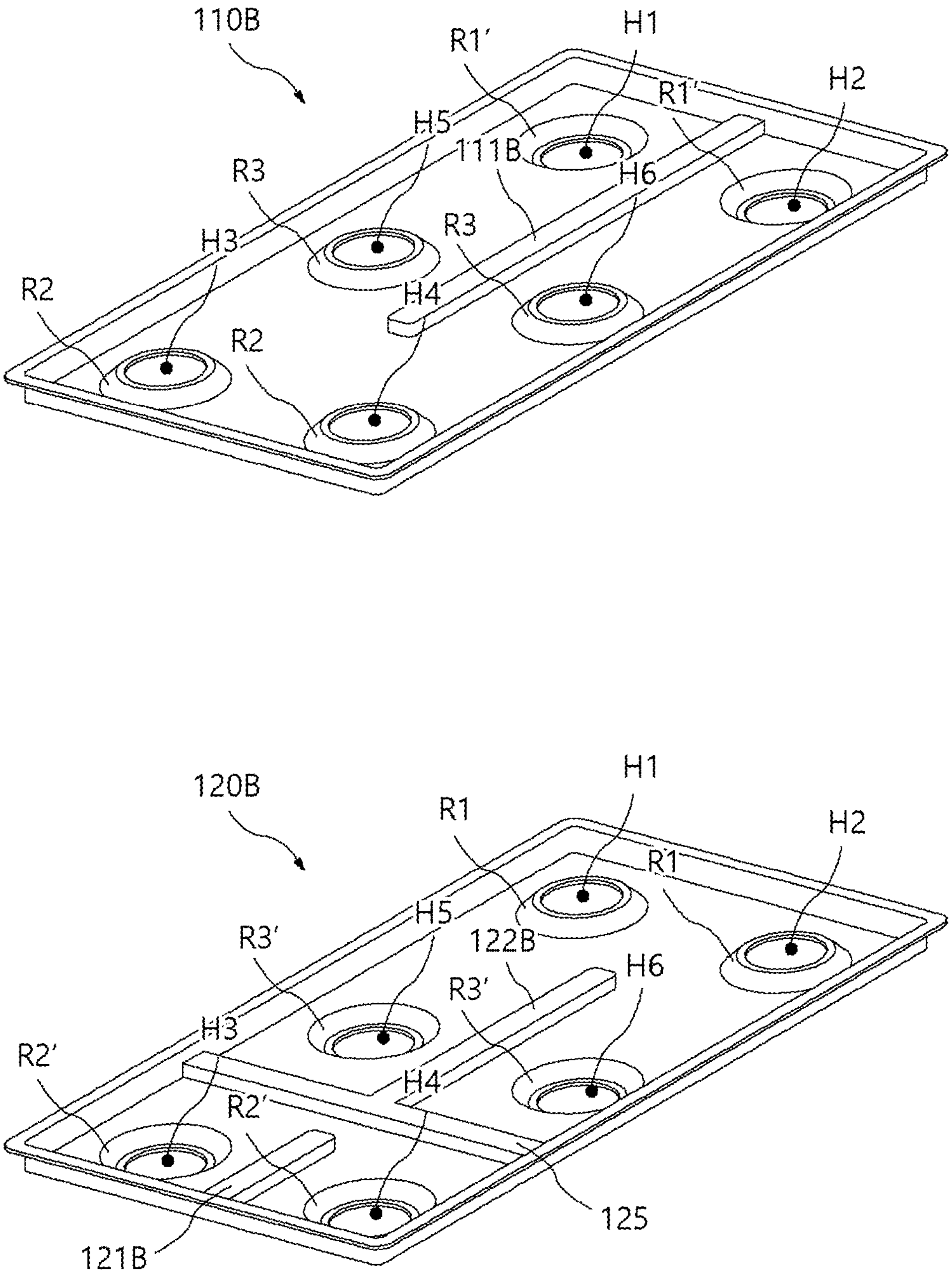
FIG. 17 shows first and second plates of the heat exchanger according to the second embodiment of the present invention.

FIGS. 2 to 14 are views for explaining the heat exchanger according to the second embodiment of the present invention; FIGS. 15 to 17 are views for explaining the heat exchanger according to the second embodiment of the present invention; and FIGS. 18 to 22 are views for explaining the heat exchanger according to the third embodiment of the present invention. As may be seen from assembled perspective views of FIGS. 2, 15, and 18 of each embodiment, the heat exchanger may be a plate heat exchanger formed by stacking a plurality of plates, and the heat exchangers according to the first, second, and third embodiments may commonly include a first fluid inlet 141, a first fluid outlet 142, a second fluid inlet 143, a second fluid outlet 144, a third fluid inlet 145, a third fluid outlet 146, and the plurality of plates stacked in the height direction.

In the plates included in a heat exchanger 100A, 100B, or 100C of the present invention, different fluids may flow alternately for each layer, like the plates used in a general plate heat exchanger. In each embodiment of the present invention, a first plate 110A, 110B, or 110C may indicate a plate including a first flow part V1 through which the first fluid flows, and a second plate 120A, 120B, or 120C may indicate a plate including a second flow part V2 through which the second fluid and/or the third fluid flows. That is, in the heat exchanger 100A, 100B, or 100C according to each embodiment of the present invention, the first plate 110A, 110B, or 110C and the second plate 120A, 120B, or 120C may be alternately stacked.

All the plates included in the heat exchanger 100A, 100B, or 100C of the present invention may have inlet holes and an outlet holes respectively communicating with the fluid inlets and the fluid outlets. The first or second embodiment may include the partition of the second or third fluid made in the length direction, and the inlet holes and outlet holes for all fluids may be positioned in all the plates. That is, six holes may be positioned in each plate. On the other hand, the third embodiment may include the partition of the second or third fluid made in the height direction, and only 4 holes may be positioned in each plate like a general two-type fluid plate heat exchanger. In detail, in the first or second embodiment, the first plate 110A or 110B and the second plate 120A or 120B may each have a first inlet hole H1 and a first outlet hole H2 through which the first fluid is introduced and discharged, respectively, a second inlet hole H3 and a second outlet hole H4 through which the second fluid is introduced and discharged, respectively, and a third inlet hole H5 and a third outlet hole H6 through which the third fluid is introduced and discharged, respectively. Here, a first junction part R1 or R1' may protrude toward the second flow part V2 from a circumference of the first inlet hole H1 or the first outlet hole H2 to block the second fluid or the third fluid from circulating to the first flow part V1, a second junction part R2 or R2' may protrude toward the first flow part V1 from a circumference of the second inlet hole H3 or the second outlet hole H4 to block the first fluid from circulating to the second flow part V2, and a third junction part R3 or R2' may protrude toward the first flow part V1 from a circumference of the third inlet hole H5 or the third outlet hole H6. On the other hand, as described above, in the third embodiment, the first plate 110C or the second plate 120C may only have the first inlet or outlet hole H1 or H2 and the second inlet or outlet hole H3 or H4. The first or second flow part V1 or V2 which is the space where the fluid flows may be positioned in an upper side of the plate by a circumference of the plate that protrudes upward. All in the first, second, and third embodiments, the plurality of plates may be stacked in the height direction. Here, the adjacent first junction parts R1 and R1' may be joined to each other, the adjacent second junction parts R2 and R2' may be joined to each other, and the adjacent third junction parts R3 and R3' may be joined to each other. As the respective junction parts are joined to each other in this way, the first flow part V1 and the second flow part V2 through which the first fluid and the second fluid and/or the third fluid flow may be alternately positioned.

In detail, the several drawings show that the junction parts R1 to R3' protrude downward from an upper plate by a portion of a height of a flow space and protrude upward from a lower plate by a remaining portion of the height of the flow space, and a flow path through which different fluids may alternately flow to different layers is formed by joining the junction parts to each other. However, the present invention is not limited thereto. For example, when the junction parts protrude from each plate by the height of the flow space, the flow path may be formed by joining the junction part and the plate to each other rather than joining the junction parts to each other. These modifications may be applied appropriately if necessary, and it is apparent that the modifications are not limited to the drawings of the present invention.

The partition may be positioned in the length direction in the first or second embodiment, and as shown in FIG. 2 to 14 or 15 to 17, the third fluid inlet 145 and the third fluid outlet 146 may be positioned in the same surface as the first and second fluid inlets 141 and 143 and the first and second fluid outlets 142 and 144. In the first embodiment, a pair of the second fluid inlet and outlet 143 and 144 may be disposed on one side of the plate in the length direction while being spaced apart from each other in a width direction, and a pair of the third fluid inlet and outlet 145 and 146 may also be disposed on the other side thereof in the length direction while being spaced apart from each other in the width direction. Here, the first fluid inlets 141 and 142 may be disposed at both ends of the plate in the length direction while being spaced apart from each other for the first fluid inlet 141 to be disposed between the pair of the second fluid inlet and outlet 143 and 144 and for the first fluid outlet 142 to be disposed between the pair of the third fluid inlet and outlet 145 and 146. In the second embodiment, the pairs of the first, second, and third fluid inlets and outlets 141 to 146 may be all spaced apart from each other in the width direction. Here, the pairs of the first and second fluid inlets and outlets 141 to 144 may respectively be disposed at both the ends of the plate in the length direction while being spaced apart from each other, and the pair of the third fluid inlet and outlet 145 and 146 may be disposed in the middle of the plate in the length direction, that is, between the pairs of the first and second fluid inlets and outlets 141 to 144. In the first and second embodiments, all the fluid inlets and outlets 141, 142, 143, 144, 145, and 146 may protrude in the same direction, thus further improving the space utilization in the engine room.

In the third embodiment, the partition is positioned in the height direction, and as shown in FIGS. 18 to 21, the pairs of the first and second fluid inlets and outlets 141 to 144 may be disposed at both the ends of the plate in the length direction while being spaced apart from each other, and the pair of the third fluid inlet and outlet 145 and 146 may be positioned to correspond to and be opposite to the pair of the second fluid inlet and outlet 143 and 144. The heat exchanger according to the third embodiment has almost the same structure as the prior two-type fluid heat exchanger (described in more detail below), and may have higher compatibility because this heat exchanger may be achieved by adding only one part to the prior heat exchanger.

In each embodiment of the present invention, some of the plurality of second flow parts V2 may be partitioned to communicate with the third fluid inlet 145 and the third fluid outlet 146 for the third fluid to circulate. Accordingly, the first fluid and the second fluid may exchange heat with each other, and simultaneously, the first fluid and the third fluid may exchange heat with each other. Hereinafter, each embodiment is described in more detail.

[1] Heat Exchanger According to First Embodiment of Present Invention

Figure 2:
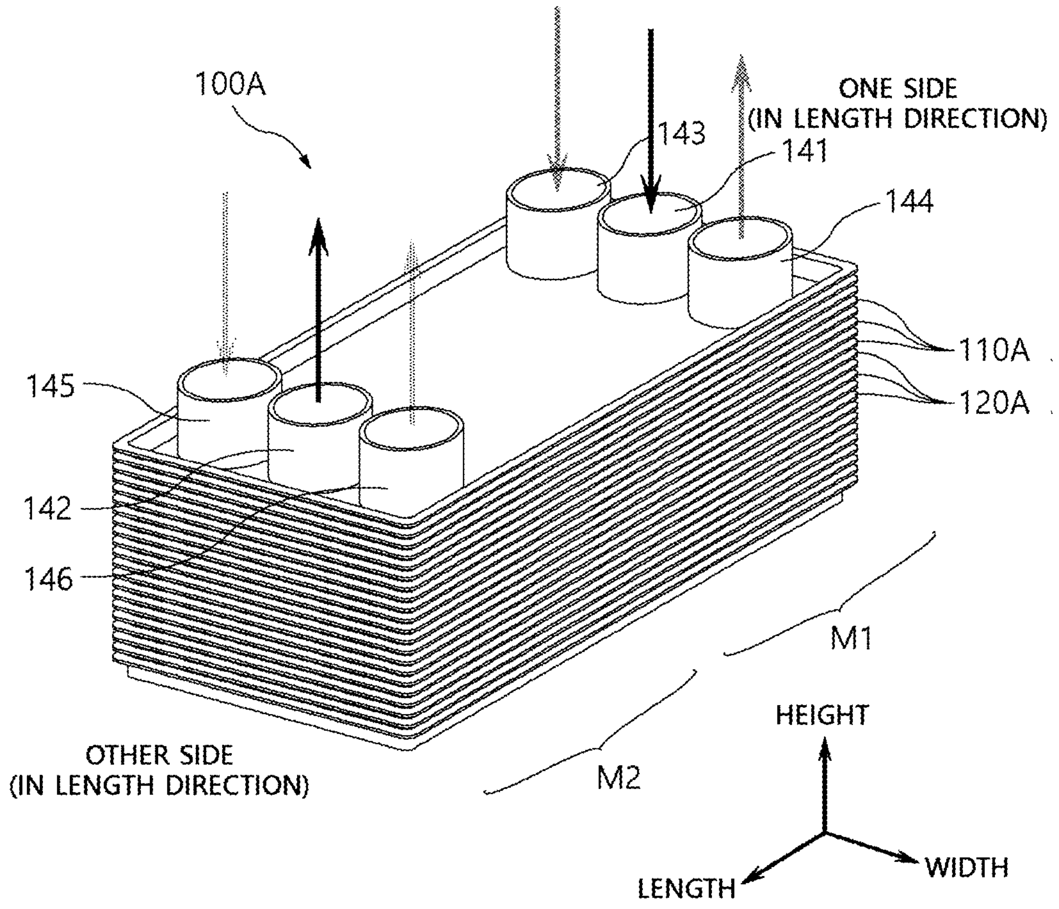
FIG. 2 is an assembled perspective view of a heat exchanger according to Embodiment 1-1 of the present invention.
Figure 9:
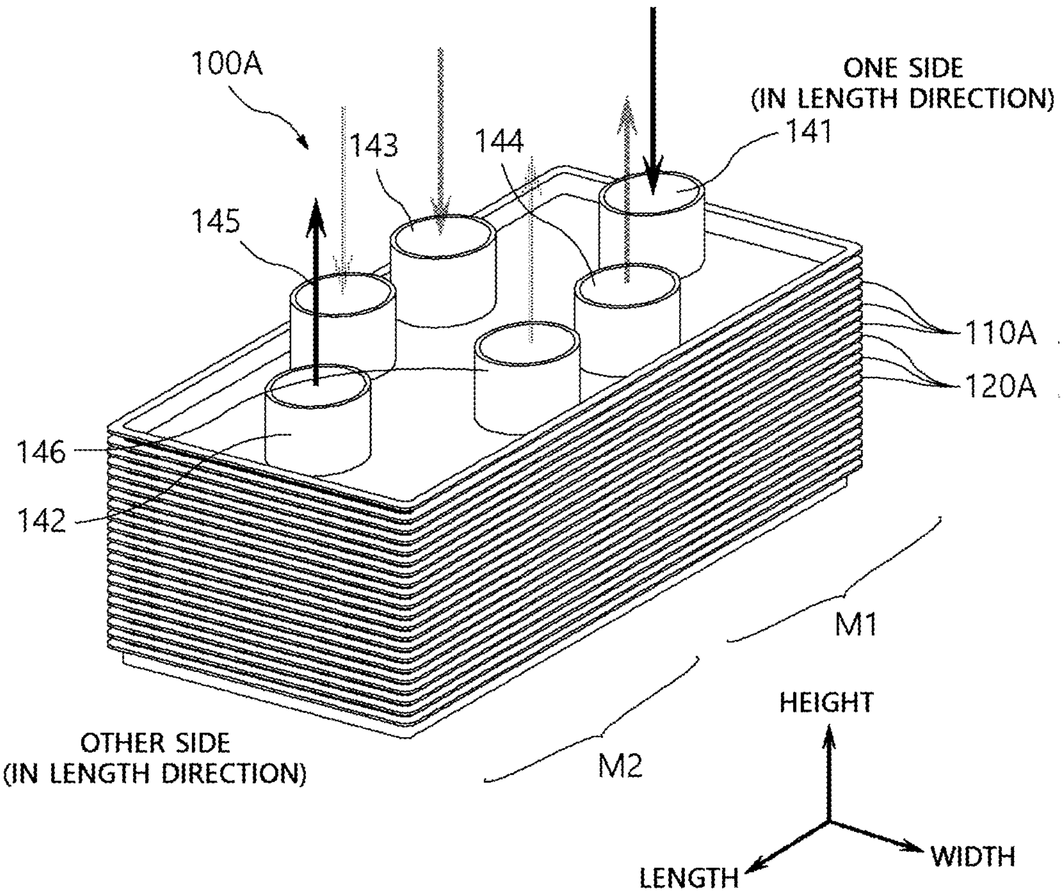
FIG. 9 is an assembled perspective view of a heat exchanger according to Embodiment 1-2 of the present invention.

FIGS. 2 and 9 are assembled perspective views of the heat exchanger according to the first embodiment of the present invention, respectively. The first embodiment may be classified into Embodiment 1-1 and Embodiment 1-2 based on modified positions of the second and third fluid inlets and outlets. In the heat exchanger 100A according to the first embodiment, the second plate 120A may be partitioned by a partition wall 125 into one side and the other side in the length direction for the second fluid and the third fluid to flow through the second flow part V2 while being isolated from each other. Accordingly, the second flow part V2 in one side selected from one side and the other side may form a second fluid region M1 where the second fluid circulates, and the second flow part V2 in the other side may form a third fluid region M2 where the third fluid circulates. FIGS. 2 and 9 exemplify that one side forms the second fluid region M1 and the other side forms the third fluid region M2.

In the heat exchanger 100A according to the first embodiment, the partition of the second and third fluids may be made in the length direction, and the first inlet hole H1 and the first outlet hole H2 may each be positioned in one side and the other side of the plate partitioned by the partition wall 125 in the length direction. In the first embodiment, the second inlet and outlet holes H3 and H4 and the third inlet and outlet holes H5 and H6 may be positioned in both the sides of the plate based on the partition wall 125. Here, Embodiments 1-1 and 1-2 may be classified from each other based on whether the holes are disposed at both the ends of the plate in the length direction or near the center of the plate in the length direction.

The following description first describes both of Embodiments 1-1 and 1-2, that is, the common matter in the entire first embodiment. In the first embodiment, the partition of the second and third fluids may be made in the second flow part V2 in the length direction by the partition wall 125 as described above, and the first inlet and outlet holes H1 and H2 may respectively be positioned in both the partitioned sides of the plate. Here, the heat exchanger 100A according to the first embodiment may have a fluid distribution structure for distributing the flow of the first fluid by protruding toward the first flow part V1 from an imaginary connection line between the first inlet hole H1 and the first outlet hole H2.

The first flow part V1 and the second flow part V2 may be alternately stacked while the second flow part V2 is partitioned in the length direction by the partition wall 125. Accordingly, the first fluid may flow in the length direction while the second and third fluids flow while forming U flows on both the sides in the length direction. Here, a flow rate may be inevitably reduced in a section where the second or third fluid makes a U-turn, and the flow rate may be increased when the fluid flows in the length direction. Considering this point, in order for the first fluid and the second fluid or the first fluid and the third fluid to perform the heat exchange as well as possible, it is necessary to drive the first fluid more in the length direction. The fluid distribution structure may be provided for this purpose, and a flow amount of the first fluid that meets portions of the second and third fluids forming the U flows while flowing in the length direction may be increased to improve the heat exchange performance as a result.

Meanwhile, from a viewpoint of the heat exchange performance as described above, the overall heat exchange performance may be apparently lower when the first fluid is concentrated to one side in the width direction. In order to avoid this problem, the first inlet hole H1 and the first outlet hole H2 may need to be disposed in the center in the width direction when disposed at both the ends in the length direction while being spaced apart from each other in the length direction. The fluid distribution structure may exist on an extension line from the first inlet hole H1 to the first outlet hole H2, and as a result, the fluid distribution structure may be disposed in the center in the width direction.

Hereinafter, the description describes a more specific configuration of the fluid distribution structure in detail while explaining Embodiment 1-1 and Embodiment 1-2.

Figure 3:
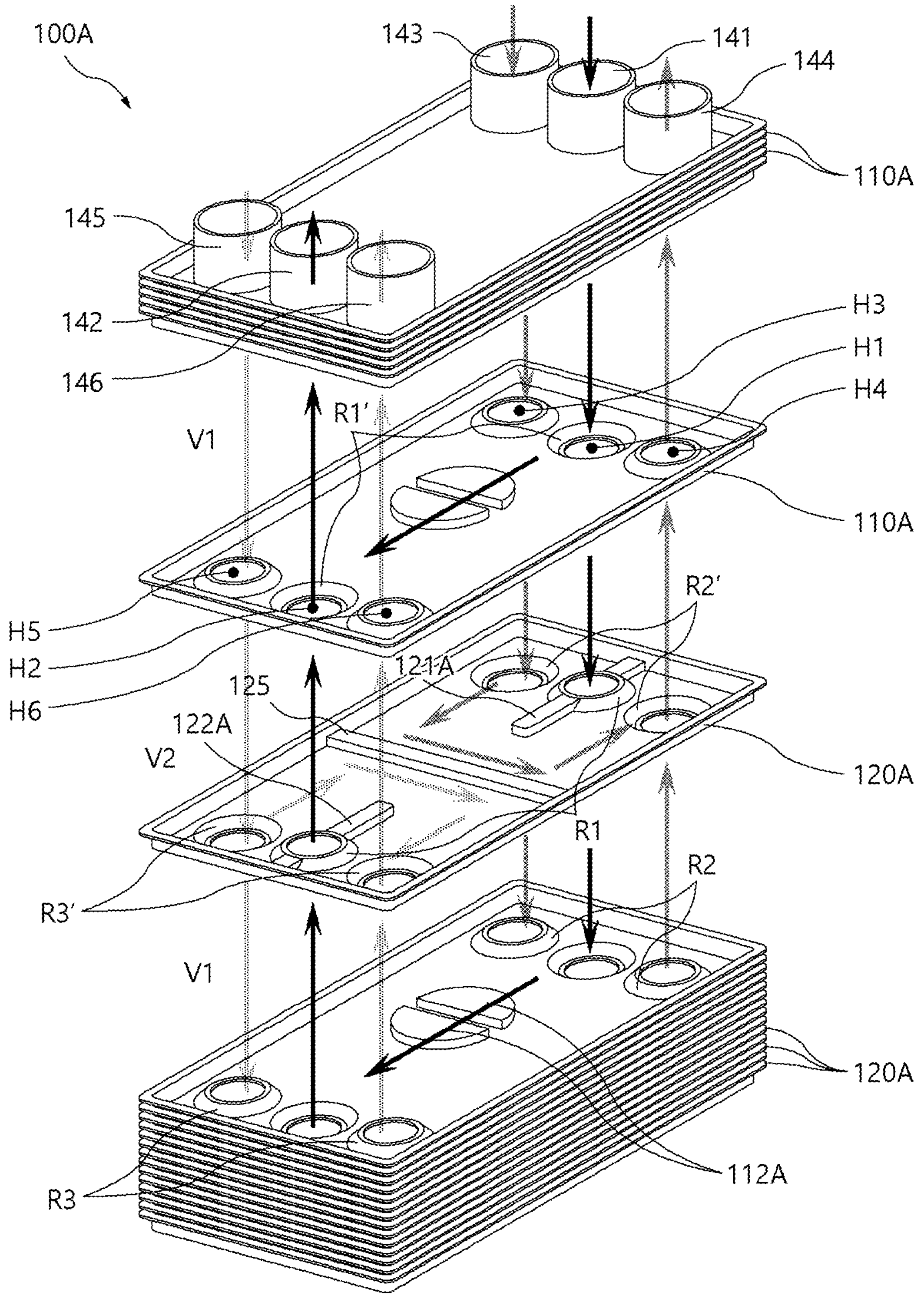
FIG. 3 is an exploded perspective view of the heat exchanger according to Embodiment 1-1 of the present invention.
Figure 4:
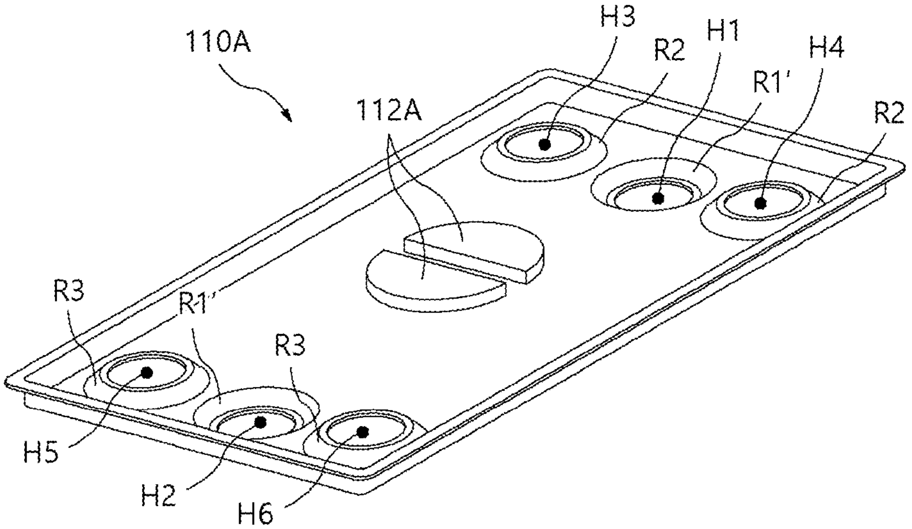
FIG. 4 shows first and second plates of the heat exchanger according to Embodiment 1-1 of the present invention.
Figure 4:
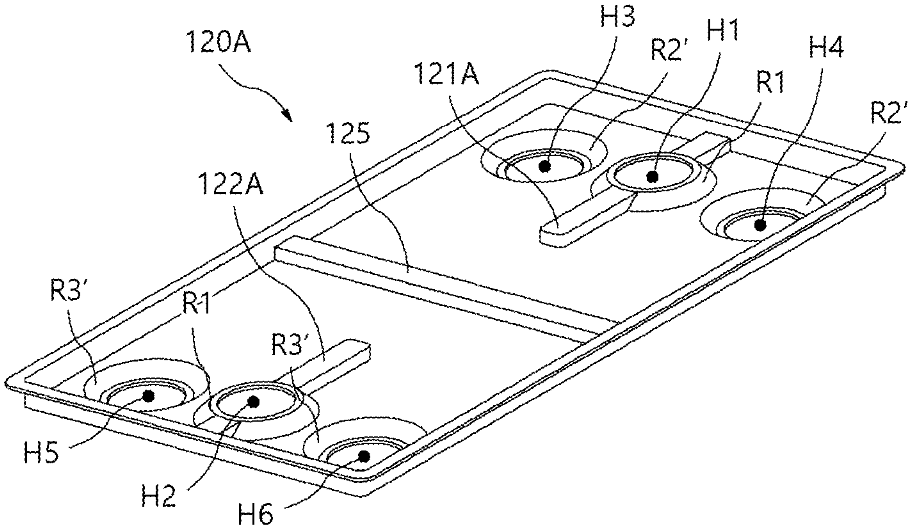

FIG. 2 is an assembled perspective view of a heat exchanger according to Embodiment 1-1 of the present invention, and FIG. 3 is an exploded perspective view of the heat exchanger according to Embodiment 1-1 of the present invention. In addition, FIG. 4 is a perspective view separately showing first and second plates of the heat exchanger according to Embodiment 1-1 of the present invention, and FIGS. 5 to 7 are top views showing the first and second plates of the heat exchanger according to Embodiment 1-1 of the present invention in more detail.

Figure 10:
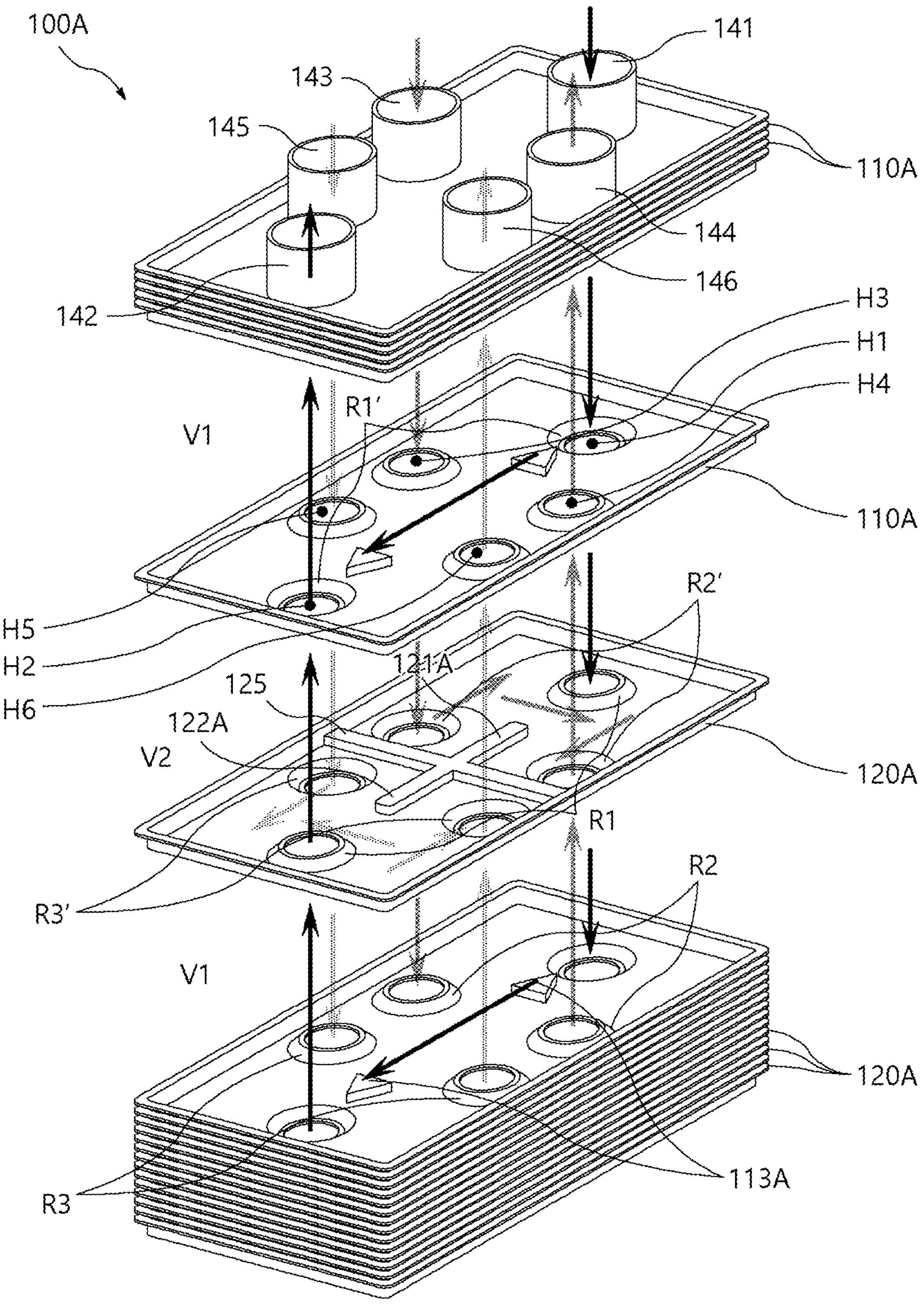
FIG. 10 is an exploded perspective view of the heat exchanger according to Embodiment 1-2 of the present invention.
Figure 11:
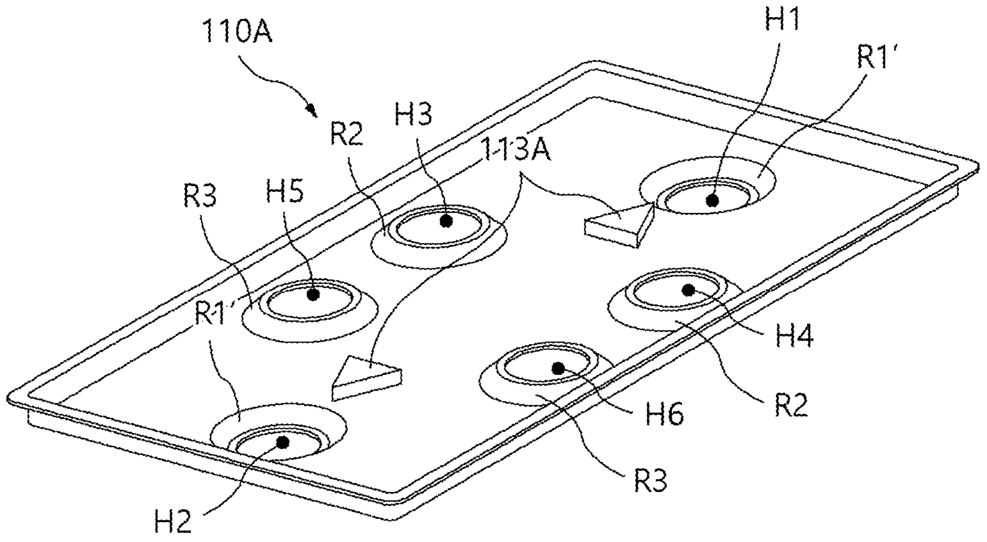
FIG. 11 shows first and second plates of the heat exchanger according to Embodiment 1-2 of the present invention.
Figure 11:
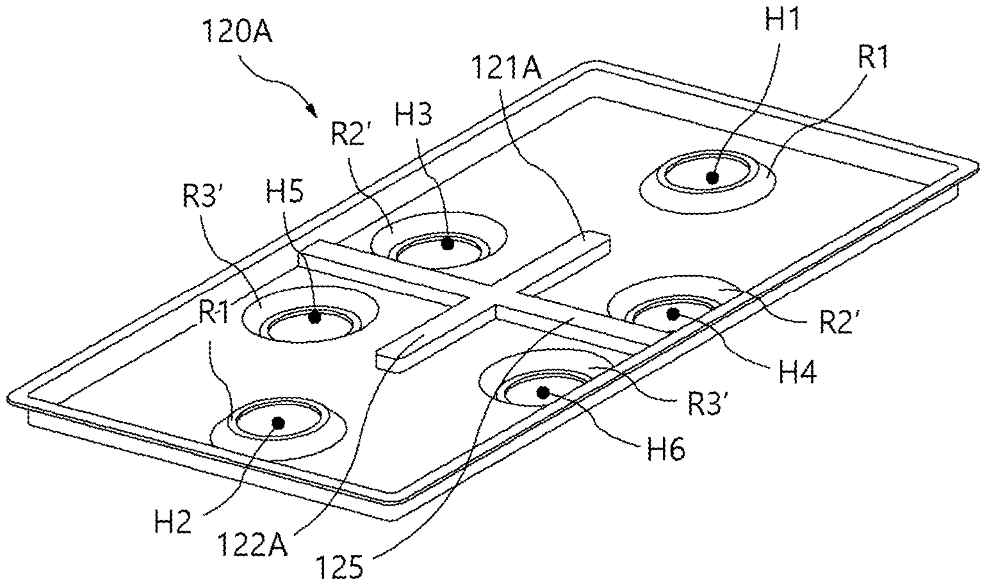

FIG. 9 is an assembled perspective view of a heat exchanger according to Embodiment 1-2 of the present invention, and FIG. 10 is an exploded perspective view of the heat exchanger according to Embodiment 1-2 of the present invention. In addition, FIG. 11 is a perspective view separately showing first and second plates of the heat exchanger according to Embodiment 1-2 of the present invention, and FIGS. 12 to 14 are top views showing the first and second plates of the heat exchanger according to Embodiment 1-2 of the present invention in more detail.

Figure 5:
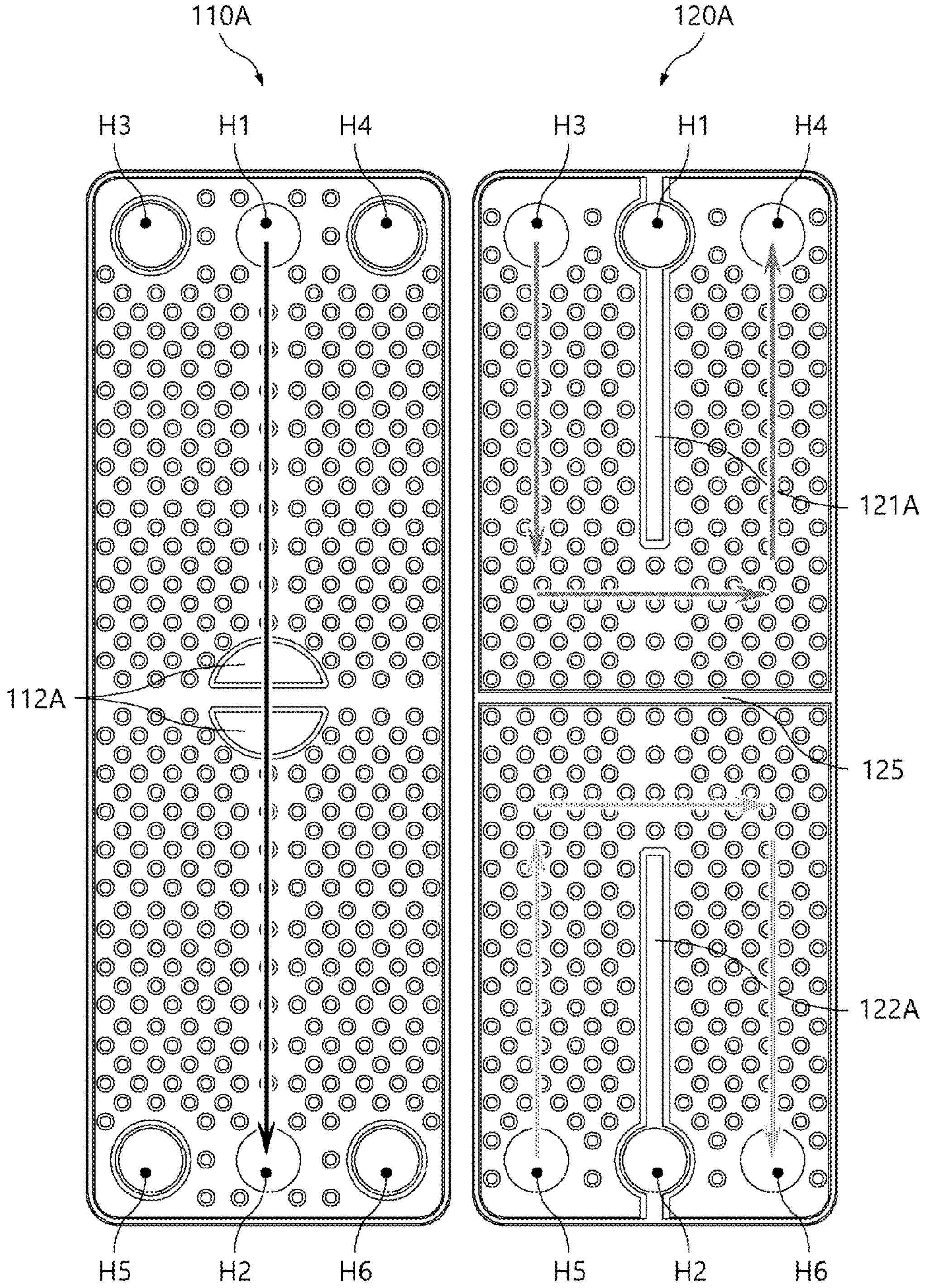
FIGS. 5 to 7 are detailed views of the first and second plates of the heat exchanger according to Embodiment 1-1 of the present invention.
Figure 6:
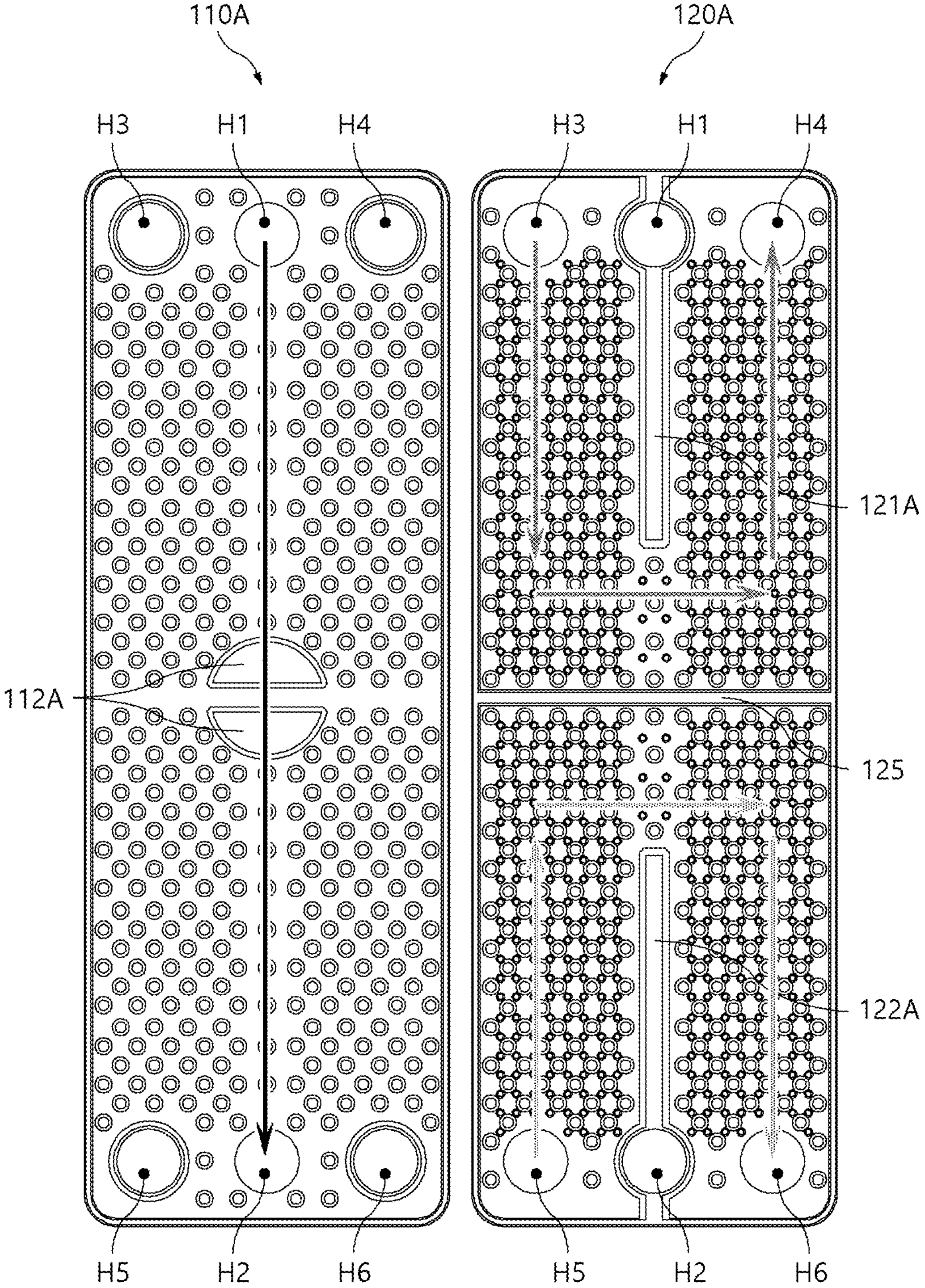
Figure 7:
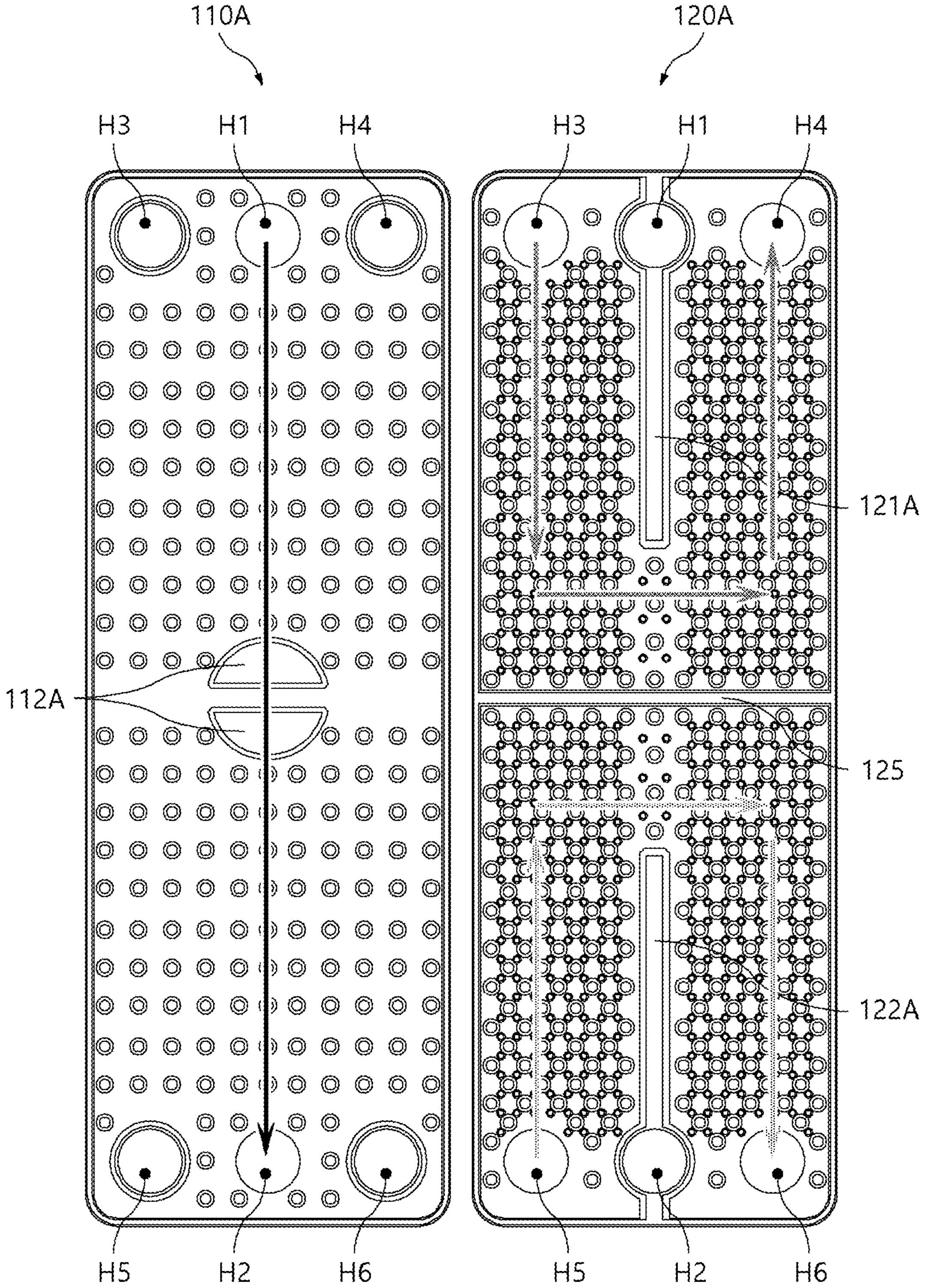

First, referring to FIGS. 5 to 7, in the heat exchanger 100A of Embodiment 1-1, the second inlet hole H3 and the second outlet hole H4 may be disposed in one end in the length direction while being spaced apart from each other in the width direction, and the third inlet hole H5 and the third outlet hole H6 may be disposed in the other end in the length direction while being spaced apart from each other in the width direction. That is, the pair of the second inlet and outlet holes H3 and H4 and the pair of the third inlet and outlet holes H5 and H6 may each be disposed in both the ends in the length direction. Here, the second plate 120A may include a guide wall for forming the U flow for the second or third fluid circulating through each inlet or outlet hole to flow through as many areas as possible without flowing only near the hole. In detail, the second plate 120A may include a second guide wall 121A extending in the length direction from one side wall of the plate to the middle to partition the second inlet hole H3 and the second outlet hole H4 of the second plate 120A from each other, thereby forming the U flow of the second fluid, and a third guide wall 122A extending in the length direction from the other side wall of the second plate 120A to the middle to partition the third inlet hole H5 and the third outlet hole H6 of the second plate 120A from each other, thereby forming the U flow of the third fluid.

Figure 12:
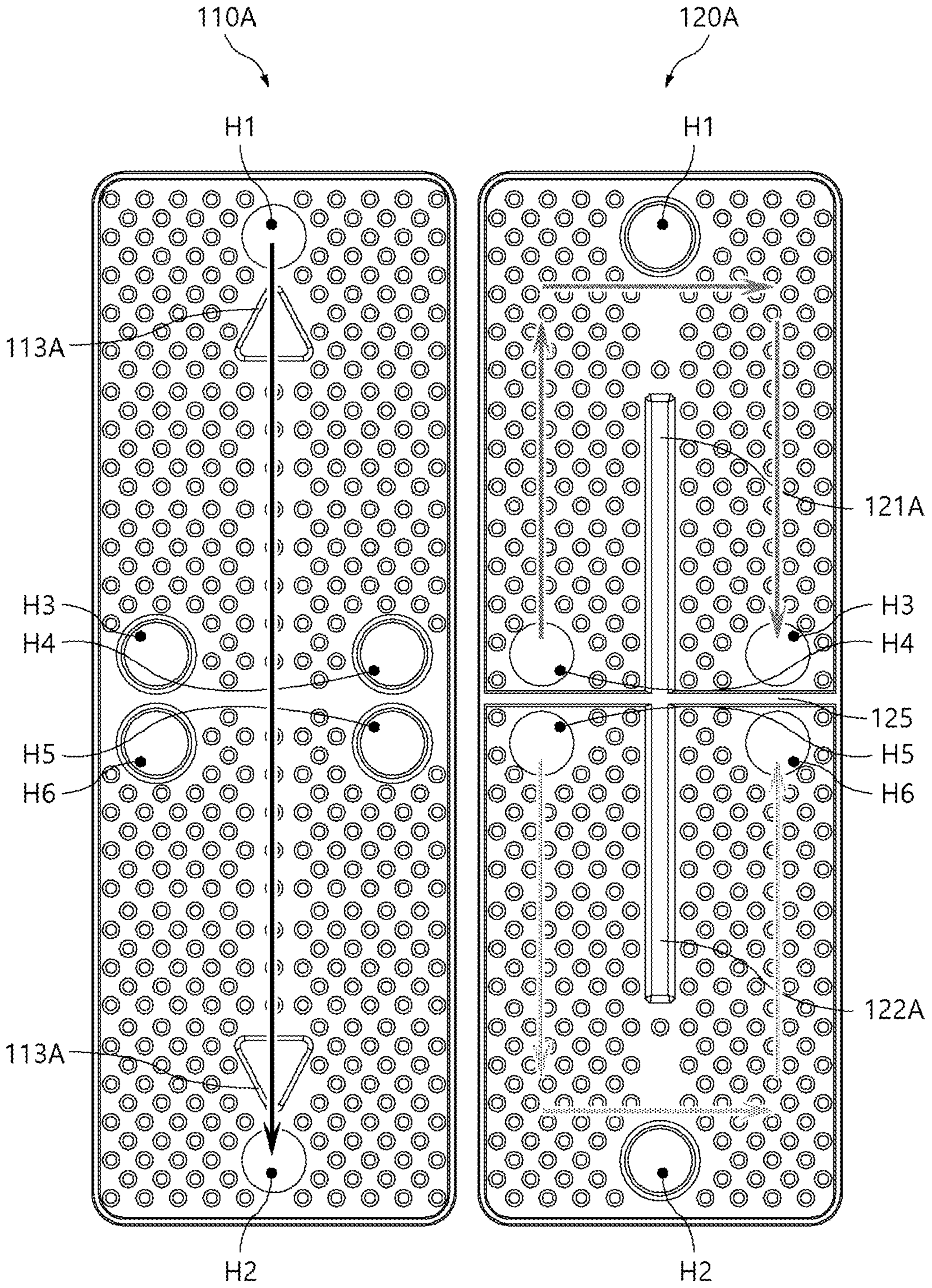
FIGS. 12 to 14 are detailed views of the first and second plates of the heat exchanger according to Embodiment 1-2 of the present invention.
Figure 13:
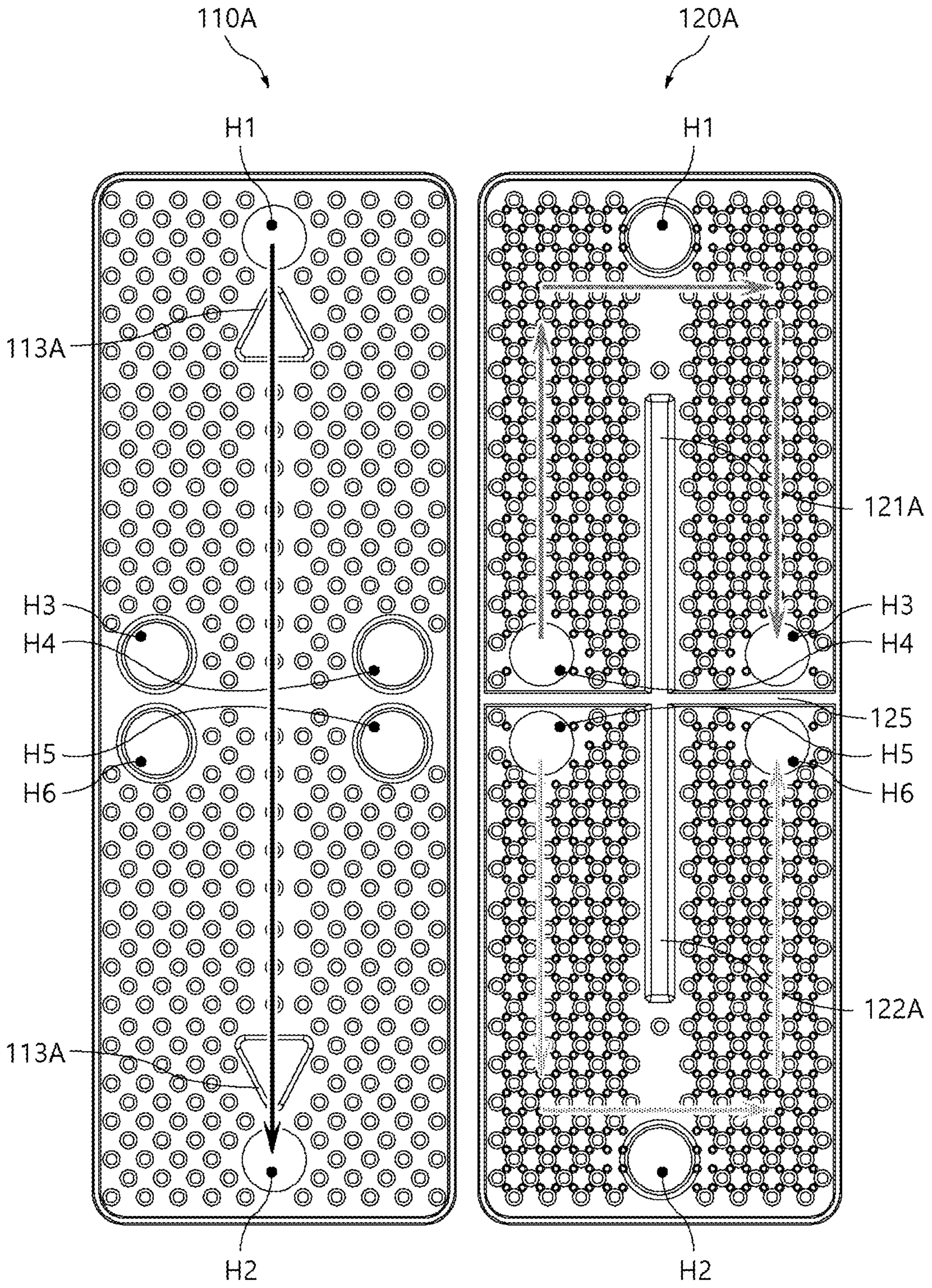
Figure 14:
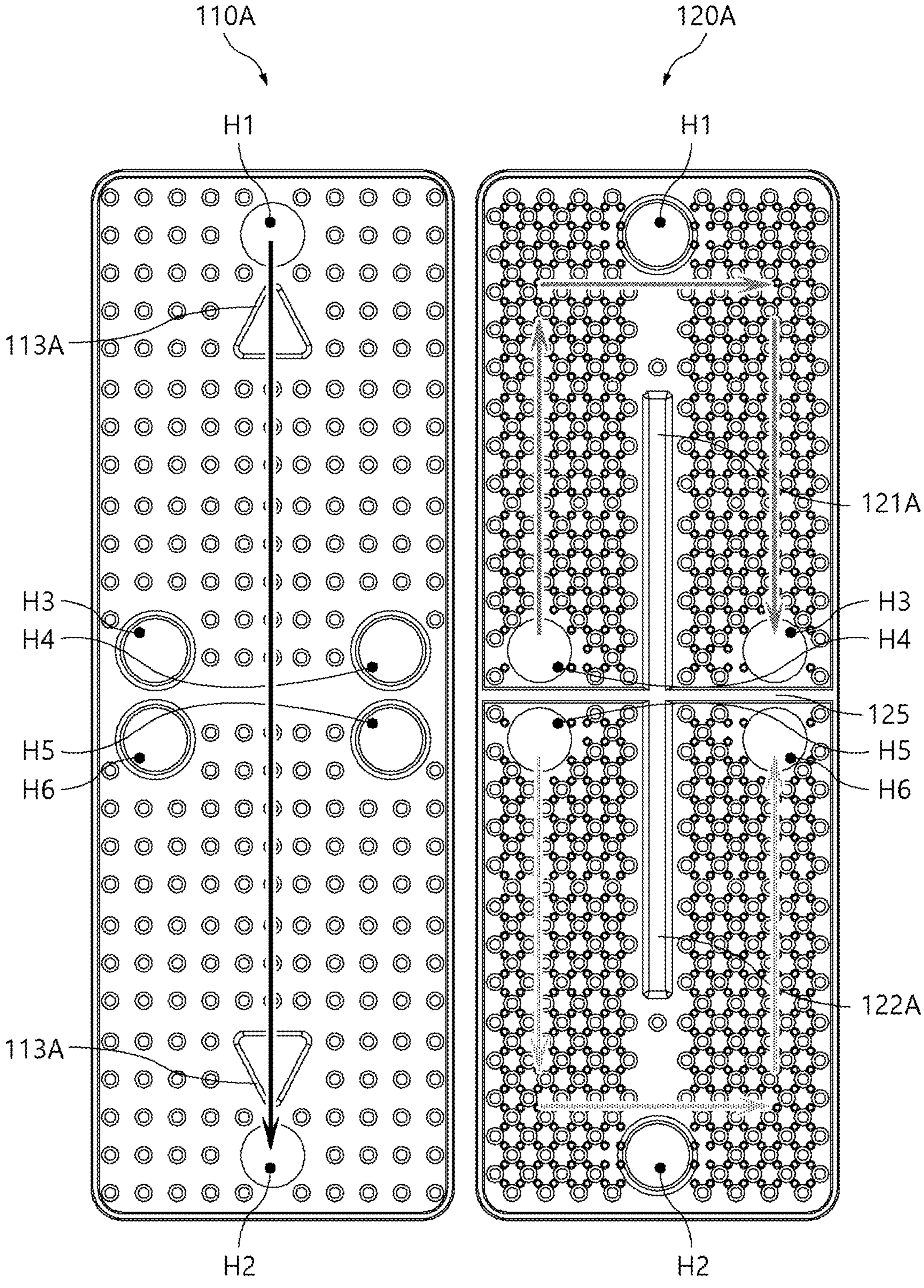

Meanwhile, referring to FIGS. 12 to 14, in the heat exchanger 100A of Embodiment 1-2, the second inlet hole H3 and the second outlet hole H4 may be biased to one side from the center in the length direction while being spaced apart from each other in the width direction, and the third inlet hole H5 and the third outlet hole H6 may be biased to the other side from the center in the length direction while being spaced apart from each other in the width direction. That is, the pair of the second inlet and outlet holes H3 and H4 and the pair of the third inlet and outlet holes H5 and H6 may each be disposed close to the center of the plate in the length direction. Here, the second plate 120A may include guide walls as in Embodiment 1-1. In this case, the positions of the holes may be opposite to those in Embodiment 1-1, and the position of the guide wall may also be opposite to that in Embodiment 1-1. That is, the second plate 120A may include the second guide wall 121A extending in the length direction from the partition wall 125 to the middle to partition the second inlet hole H3 and the second outlet hole H4 of the second plate 120A from each other, thereby forming the U flow of the second fluid, and the third guide wall 122A extending in the length direction from the partition wall 125 to the middle to partition the third inlet hole H5 and the third outlet hole H6 of the second plate 120A from each other, thereby forming the U flow of the third fluid.

Referring to FIGS. 5 to 7 and 12 to 14, in both of Embodiment 1-1 and Embodiment 1-2, the first fluid may flow in a straight line from the first inlet hole H1 to the first outlet hole H2. As described above, the fluid distribution structure may be provided for properly distributing the flow of the first fluid flowing from the first inlet hole H1 to the first outlet hole H2.

Here, the fluid distribution structure may have a protruding area becoming smaller as being closer to the first inlet hole H1 or the first outlet hole H2 for the first fluid to be effectively distributed and flow. As an example of this shape, the fluid distribution structure may have a circular arc shape of Embodiment 1-1 as shown in FIGS. 5 to 7, or a triangular shape of Embodiment 1-2 as shown in FIGS. 12 to 14.

Meanwhile, the space where the first fluid flows may be the first flow part V1, that is, a space formed in the first plate 110A, and the first fluid may thus smoothly flow from the first inlet hole H1 to the first outlet hole H2 regardless of the partition wall 125. However, the partition wall 125 may be a structure positioned on the second plate 120A and protrude toward the second flow part V2, and the first flow part V1 and the second flow part V2 may be alternately stacked. Accordingly, position of the partition wall 125 may form a space recessed upward when viewed from the first flow part V1. This recessed space may cause internal leak that the fluid partitioned by the partition wall 125 passes from one side to the other side (or from the other side to one side). In order to prevent the internal leak from occurring at the position of the partition wall 125, the fluid distribution structure may be positioned not to correspond to the partition wall 125 positioned on the second plate 120A.

Figure 8:
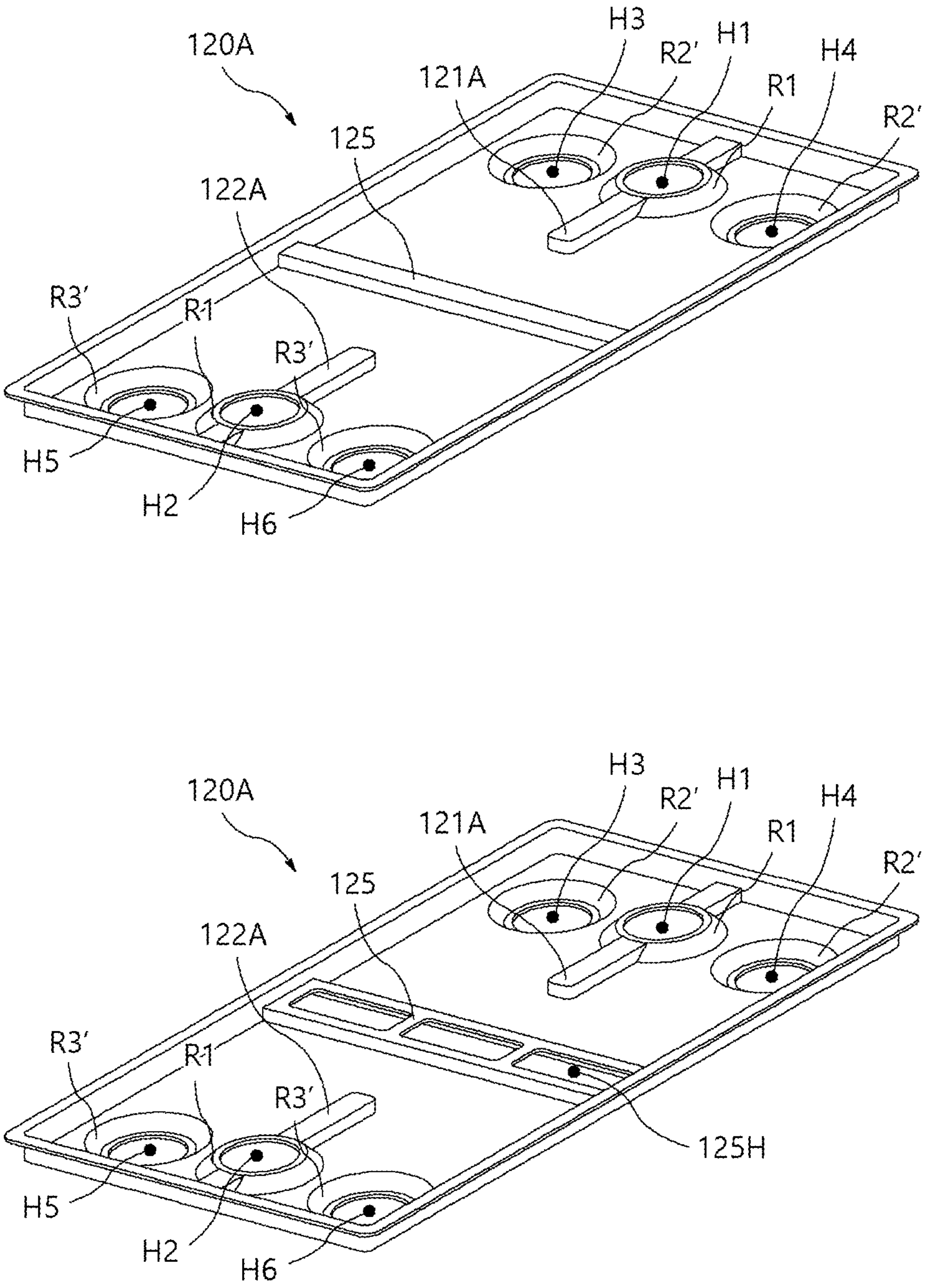
FIG. 8 shows various examples of a partition wall of the heat exchanger according to the present invention.

In addition, the partition wall 125 is described in more detail as follows. FIG. 8 shows various examples of the partition wall of the heat exchanger according to the present invention. An upper drawing of FIG. 8 is the same as the perspective view of the second plate 120A of Embodiment 1-1 shown as a lower drawing of FIG. 7. As described above, the partition wall 125 may be a structure for partitioning the second flow part V2 for the second fluid to flow in one side and the third fluid to flow in the other side flow while being isolated from each other. Here, the second and third fluids may be the fluids in different operating temperature ranges (e.g., one is the coolant for cooling a battery and the other is the coolant for cooling a motor). Here, the partition wall 125 may be a structure formed by substantially pressing and bending a single plate material, and unwanted heat transfer may thus occur between the second and third fluids along the partition wall 125. In order to prevent this problem, at least one partition wall hole 125H as shown in a lower drawing of FIG. 8 may be positioned in the partition wall 125. In detail, the partition wall hole 125H may be positioned in a surface of the partition wall 125 that is joined to the adjacent first plates 110A and 110B. As described above, the partition wall hole 125H may reduce a heat transfer area of the heat transfer occurring along the partition wall 125, thereby reducing the unwanted heat transfer between the second and third fluids. In addition, when the partition wall 125 is not completely joined to the adjacent first plates 110A and 110B, the internal leak may occur through the partition wall hole 125H, and the partition wall hole 125H may also be used to check whether the internal leak occurs.

Considering all the above conditions, the fluid distribution structures in Embodiment 1-1 and Embodiment 1-2 may be made slightly different from each other in their positions or shapes in order for its optimization.

First, the fluid distribution structure in Embodiment 1-1 may have a shape of half-moon ribs 112A shown in FIGS. 5 to 7. In more detail, the half-moon ribs 112A may be positioned on the center of the first plate 110A, and may each have a half-moon shape in which its side adjacent to the first inlet hole H1 or the first outlet hole H2 is a circular arc, and its central side is a straight line. The fluid distribution structure in Embodiment 1-1 may have a triangular shape. However, a major flow of the first fluid needs to be separated from the center in Embodiment 1-1, and the fluid distribution structure may thus be required to distribute the fluid flow somewhat softly and gently. Accordingly, it is advantageous for the fluid distribution structure to have the half-moon shape rather than the triangular shape.

In addition, the fluid distribution structure in Embodiment 1-1 may be positioned on the center of the first plate 110A, which leads to a risk that its position corresponds to that of the partition wall 125 also positioned on the center of the second plate 120A. Therefore, the pair of half-moon ribs 112A may be spaced apart from each other at an appropriate interval not to correspond to the partition wall 125 positioned on the adjacent second plate 120A.

Meanwhile, the fluid distribution structure in Embodiment 1-2 may have a shape of triangular ribs 113A shown in FIGS. 12 to 14. In more detail, the triangular ribs 113A may be positioned adjacent to the first inlet hole H1 or the first outlet hole H2, and may each have the triangular shape in which its side adjacent to the first inlet hole H1 or the first outlet hole H2 is a vertex and its central side is a straight line. The fluid distribution structure in Embodiment 1-2 may also have the half-moon shape. However, minor flows of the first fluid need to be separated from each other immediately after the first fluid is introduced to the first inlet hole H1 or immediately before the first fluid is discharged to the first outlet hole H2 in Embodiment 1-2, and the fluid distribution structure may thus be required to distribute the fluid flow somewhat sharply. Accordingly, it is advantageous for the fluid distribution structure to have the triangular shape rather than the half-moon shape.

In addition, the fluid distribution structure may be positioned adjacent to the first inlet hole H1 or the first outlet hole H2 in Embodiment 1-2, may thus be already far away from the partition wall 125 positioned on the center of the second plate 120A, and may thus have no risk of interference with the partition wall 125. However, not only the partition wall 125 but also the first or second guide wall 121A or 122A (for forming the U flow of the second fluid) may be positioned on the second plate 120A, and it is thus necessary to consider a risk of the interference of the fluid distribution structure with these components. Therefore, the triangular rib 113A may be positioned not to overlap the position of the first or second guide wall 121A or 122A.

None of FIGS. 2 to 4 and 9 to 11 among the various drawings of the first embodiment shows beads on the first plate 110A or the second plate 120A in order to better show an overall structure of the heat exchanger. However, as described above, the technology is well known for further improving the heat exchange performance by generally arranging the beads on the plate included in the plate heat exchanger. Even though the present invention omits the illustration of the beads, it is apparent that the beads may be arranged on the plate. That is, in the heat exchanger 100A, the plurality of beads may be arranged on the first plate 110A and the second plate 120A.

FIGS. 5 to 7 and 12 to 14 are top views of the first and second plates 110A and 120A in Embodiment 1-1 and Embodiment 1-2, respectively, where the beads are specifically shown. FIG. 5 of Embodiment 1-1 and FIG. 12 of Embodiment 1-2 show that the beads arranged on the first and second plates 110A and 120A have the same bead density. Here, the "bead density" may indicate the number of beads arranged on a predetermined plate area. However, when the beads arranged on the first and second plates 110A and 120A are all arranged at the same position, there is a risk that a fluid flow characteristic may be poor due to interference therebetween. Accordingly, as shown in the drawings, the beads arranged on the first plate 110A and the beads arranged on the second plate 110B are required to be misaligned with each other.

Meanwhile, a structure in which the bead density is formed equally on each plate may be optimal based on the operating temperature range or viscosity of the first, second, or third fluid, etc. However, as a specific example, it is previously described that the first fluid may be the refrigerant, and the second and third fluids may be the coolant for a battery and the coolant for a motor. In this case, a difference may exist in the viscosity of the refrigerant and that of the coolant, and different bead densities rather than the same bead density may thus further improve the heat exchange performance. FIG. 6 of Embodiment 1-1 and FIG. 13 of Embodiment 1-2 exemplify that the bead density on the first plate 110A is lower than the bead density on the second plate 110B by adding a sub-dimple in the second plate 120A. When the sub-dimple is added, the heat exchange performance may tend to be improved due to an increased heat exchange area. However, the refrigerant may have increased resistance and a higher refrigerant temperature, which adversely affects the heat exchange performance. Therefore, when the first fluid is the refrigerant, and the second and third fluids are cooling water, the sub-dimple may be added only to the second plate 120A.

FIG. 7 of Embodiment 1-1 and FIG. 14 of the embodiment of FIGS. 1-2 exemplify that the sub-dimple is added to the second plate 120A and simultaneously, the bead density on the first plate 110A is lower. The refrigerant may have a lower refrigerant temperature as resistance is reduced, and the heat exchange performance may thus be increased by increasing a difference in the refrigerant temperature and a coolant temperature. Therefore, as shown in FIGS. 7 and 14, the bead density on the first plate 110A may be further lower. However, there may be a problem with pressure resistance when the bead density is too low, and the bead density may be determined to an appropriate level by considering this matter, the viscosity of the refrigerant, etc.

[2] Heat Exchanger According to Second Embodiment of Present Invention

FIG. 15 is an assembled perspective view of the heat exchanger according to the second embodiment of the present invention. As in the first embodiment, in the heat exchanger 100B according to the second embodiment, the second plate 120A may be partitioned by the partition wall 125 into one side and the other side in the length direction, and the second fluid and the third fluid may flow through the second flow part V2 while being isolated from each other. Accordingly, the second flow part V2 in one side selected from one side and the other side may form the second fluid region M1 where the second fluid circulates, and the second flow part V2 in the other side may form the third fluid region M2 where the third fluid circulates. FIG. 15 exemplifies that the other side forms the second fluid region M1 and one side forms the third fluid region M2.

In the heat exchanger 100B according to the second embodiment, the partition of the second and third fluids may be made in the length direction, and the first inlet hole H1 and the first outlet hole H2 may be positioned in any one selected from one side and the other side in the length direction partitioned by the partition wall 125. The first inlet hole H1 and the first outlet hole H2 in the first embodiment may each be positioned in one side and the other side of the partition wall 125, whereas the first inlet hole H1 and the first outlet hole H2 in the second embodiment are different from the first embodiment in that the holes are concentrated in one side or the other side.

In the second embodiment, similar to the general two-type fluid heat exchanger, the first fluid may flow while forming the U flow in the first flow part V1. However, the second flow part V2 may be partitioned into one side and the other side in the length direction by the partition wall 125, and the second and third fluids may each flow while forming the U flow. In order to implement this flow, in the heat exchanger 100B according to the second embodiment, the first inlet hole H1 and the first outlet hole H2 may be disposed in one end in the length direction while being spaced apart from each other in the width direction, the second inlet hole H3 and the second outlet hole H4 may be disposed in the other end in the length direction while being spaced apart from each other in the width direction, and the third inlet hole H5 and the third outlet hole H6 may be disposed in the middle in the length direction while being spaced apart from each other in the width direction.

Meanwhile, although not shown in the drawings, the partition wall hole 125H in the first embodiment may also be positioned in the partition wall 125 in the second embodiment. As in the first embodiment, the partition wall hole 125H may block the unwanted heat transfer between the second and third fluids, and also be used to check whether the internal leak occurs if necessary.

FIG. 16 is an exploded perspective view of the heat exchanger according to the second embodiment of the present invention, and FIG. 17 separately shows first and second plates of the heat exchanger according to the second embodiment of the present invention. The description describes the heat exchanger according to the second embodiment of the present invention, in particular, a specific configuration of the plate in detail with reference to these drawings.

As shown in FIGS. 16 and 17, the plates in the second embodiment may include two types of a first plate 110B and a second plate 120B. In addition, the plates may each be hollow to communicate with the third fluid inlet 145 and the third fluid outlet 146, and include the third inlet hole H5 and the third outlet hole H6 on circumferences of which the third junction parts R3 and R3' protrude in directions respectively opposite to those of the first junction parts R1 and R1'. Therefore, the adjacent third junction parts R3 and R3' may be joined to each other when the plurality of plates are stacked in the height direction. As described in more detail below, the directions in which the third junction parts R3 and R3' protrude may be the same as those of the second junction parts R2 and R2' (that is, respectively opposite to those of the first junction part R1 and R1').

In the first plate 110B, the first junction part R1' may protrude downward from a circumference of the first inlet hole H1 or that of the first outlet hole H2, the second junction part R2 may protrude upward from a circumference of the second inlet hole H3 or that of the second outlet hole H4, and the third junction part R3 may protrude upward from the circumference of the third inlet hole H5 or that of the third outlet hole H6. Accordingly, in the fluid flow space in the upper side of the first plate 110B, the second junction part R2 and the second junction part R2' protruding downward from the adjacent plate may be joined to each other to thus close the circulation of the second fluid, the third junction part R3 and the third junction part R3' protruding downward from the adjacent plate may be joined to each other to close the circulation of the third fluid, and the fluid flow space may thus form the first flow part V1 through which the first fluid circulates.

In the second plate 120B, the first junction part R1 may protrude upward from the circumference of the first inlet hole H1 or that of the first outlet hole H2, the second junction part R2' may protrude downward from the circumference of the second inlet hole H3 or that of the second outlet hole H4, and the third junction part R3' may protrude downward from the circumference of the third inlet hole H5 or that of the third outlet hole H6. In addition, the second plate 120B may include the partition wall 125 extending throughout the width direction to partition the second inlet hole H3 and the second outlet hole H4 from each other, and partition the third inlet hole H5 and the third outlet hole H6 from each other. In addition, the partition wall 125 may protrude upward for its upper surface to be in contact with a bottom surface of the adjacent upper plate. Accordingly, the spaces in one side and the other side of the partition wall 125 may be completely isolated from each other by the partition wall 125 when the plates are stacked in the height direction. Through this structure, in the fluid flow space in the upper side of the second plate 120B, the first junction part R1 and the first junction part R1' protruding downward from the adjacent plate may be joined to each other to close the circulation of the first fluid. Accordingly, the fluid flow space may form the second flow part V2 through which the second fluid circulates in one part partitioned by the partition wall 125 and the third fluid circulates in the remaining part.

In this way, in the heat exchanger 100B according to the second embodiment, the second fluid region M1 and the third fluid region M2 may be partitioned in the length direction by the partition wall 125. Although FIGS. 15 to 17 show that the third fluid region M2 is significantly larger than the second fluid region M1. However, this configuration is only an example, and it is apparent that the position of the partition wall 125 may be adjusted if necessary to adjust the flow amount of the second or the third fluid as desired.

Further, the first or second plate 110B or 120B may include first, second, and third guide walls 111B, 121B, and 122B for the fluid to more smoothly circulate therein. Each guide wall may serve an almost similar role. For clarity, each guide wall is described in detail as follows.

The first guide wall 111B may extend in the length direction from one side wall of the first plate 110B to the middle to partition the first inlet hole H1 and the first outlet hole H2 in the first plate 110B from each other. In addition, the first guide wall 111B may protrude upward for its upper surface to be in contact with a bottom surface of the adjacent upper plate. Accordingly, the first flow part V1 may include a fluid path in which the first fluid introduced from one side through the first inlet hole H1 is guided to the other side by the first guide wall 111B and circulate, and guided from the other side to one side by the first guide wall 111B and discharged through the first outlet hole H2.

The second guide wall 121B may extend in the length direction from the other side wall of the second plate 120B to the middle to partition the second inlet hole H3 and the second outlet hole H4 in the second plate 120B from each other. In addition, the second guide wall 121B may protrude upward for its upper surface to be in contact with a bottom surface of the adjacent upper plate. Accordingly, the second flow part V2 in a partition space of the other side may include a fluid path in which any one of the second fluid and the third fluid, introduced from the other side through the second inlet hole H3 (the second fluid in FIG. 16) is guided to one side by the second guide wall 121B and circulates, and guided from one side to the other side by the second guide wall 121B and discharged through the second outlet hole H4.

The third guide wall 122B may extend in the length direction from the partition wall 125 to the middle to partition the third inlet hole H5 and the third outlet hole H6 in the second plate 120B from each other. In addition, the third guide wall 122B may protrude upward for its upper surface to be in contact with a bottom surface of the adjacent upper plate. Accordingly, the second flow part V2 in the partition space of one side may include a fluid path in which the other one of the second fluid and the third fluid, introduced from the other side through the third inlet hole H5 is guided to one side by the third guide wall 122B and circulates, and guided from one side to the other side by the third guide wall 122B and discharged through the third outlet hole H6.

[3] Heat Exchanger According to Third Embodiment of Present Invention

Figure 18:
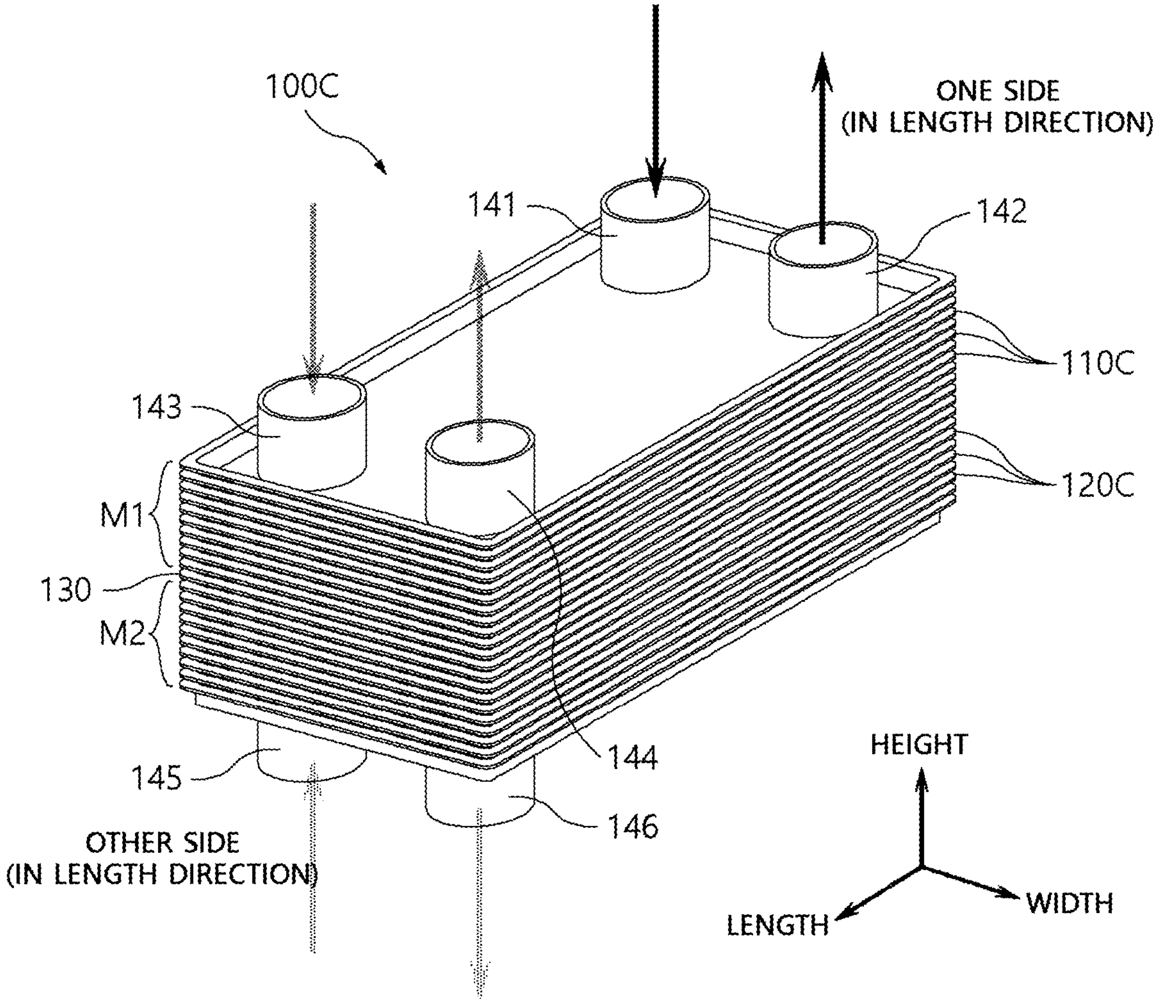
FIG. 18 is an assembled perspective view of a heat exchanger according to a third embodiment of the present invention.

FIG. 18 is an assembled perspective view of the heat exchanger according to the third embodiment of the present invention. In the heat exchanger 100C according to the third embodiment, similar to the first plate 110C, only a single fluid may flow through the second plate 120C (unlike the two types of fluid flow in the first or second embodiment). That is, any one selected from the second fluid and the third fluid may flow through the second flow part V2 formed in the second plate 120C. Meanwhile, in the heat exchanger 100C in the third embodiment, the plurality of the second flow parts V2 stacked in the height direction may be partitioned from each other in the height direction. To this end, the heat exchanger 100C may include a diaphragm plate 130 including the second flow part V2 and blocking the circulation of the second or third fluid in a stack direction of the plates. In detail, in the heat exchanger 100C, one of the stacked second plates 120C may be replaced by the diaphragm plate 130, thus enabling the first and second fluids to circulate in one side (or an upper side in the example of FIG. 18), and the first and third fluids to circulate in the other side (or a lower side in the example of FIG. 18), based on position of the diaphragm plate 130. Accordingly, the second flow part V2 in one part of the upper or lower side may form the second fluid region M1 where the second fluid circulates, and the second flow parts V2 in the remaining part may form the third fluid region M2 where the third fluid circulates. FIG. 18 exemplifies that the upper side forms the second fluid region M1 and the lower side forms the third fluid region M2. However, the present invention is not limited thereto.

The partition of the second and third fluids may be made in the height direction in the heat exchanger 100C of the third embodiment. That is, as described above, the heat exchanger 100C of the third embodiment may have the inlet and outlet holes H1 to H4 whose number and positions are the same as those of the two-type fluid plate heat exchanger in the prior art, and only further include the diaphragm plate for the partition in the height direction.

In the third embodiment, like the general two-type fluid heat exchanger, the first fluid may flow through the first flow part V1 while forming the U flow, and any one selected from the second fluid and the third fluid may flow through the second flow part V2 while forming the U-flow. In order to implement this flow, like the general two-type fluid heat exchanger, in the heat exchanger 100C in the third embodiment, the first inlet hole H1 and the first outlet hole H2 may be disposed in one end of the plate in the length direction while being spaced apart from each other in the width direction, and the second inlet hole H3 and the second outlet hole H4 may be disposed in the other end of the plate in the length direction while being spaced apart from each other in the width direction.

Figure 19:
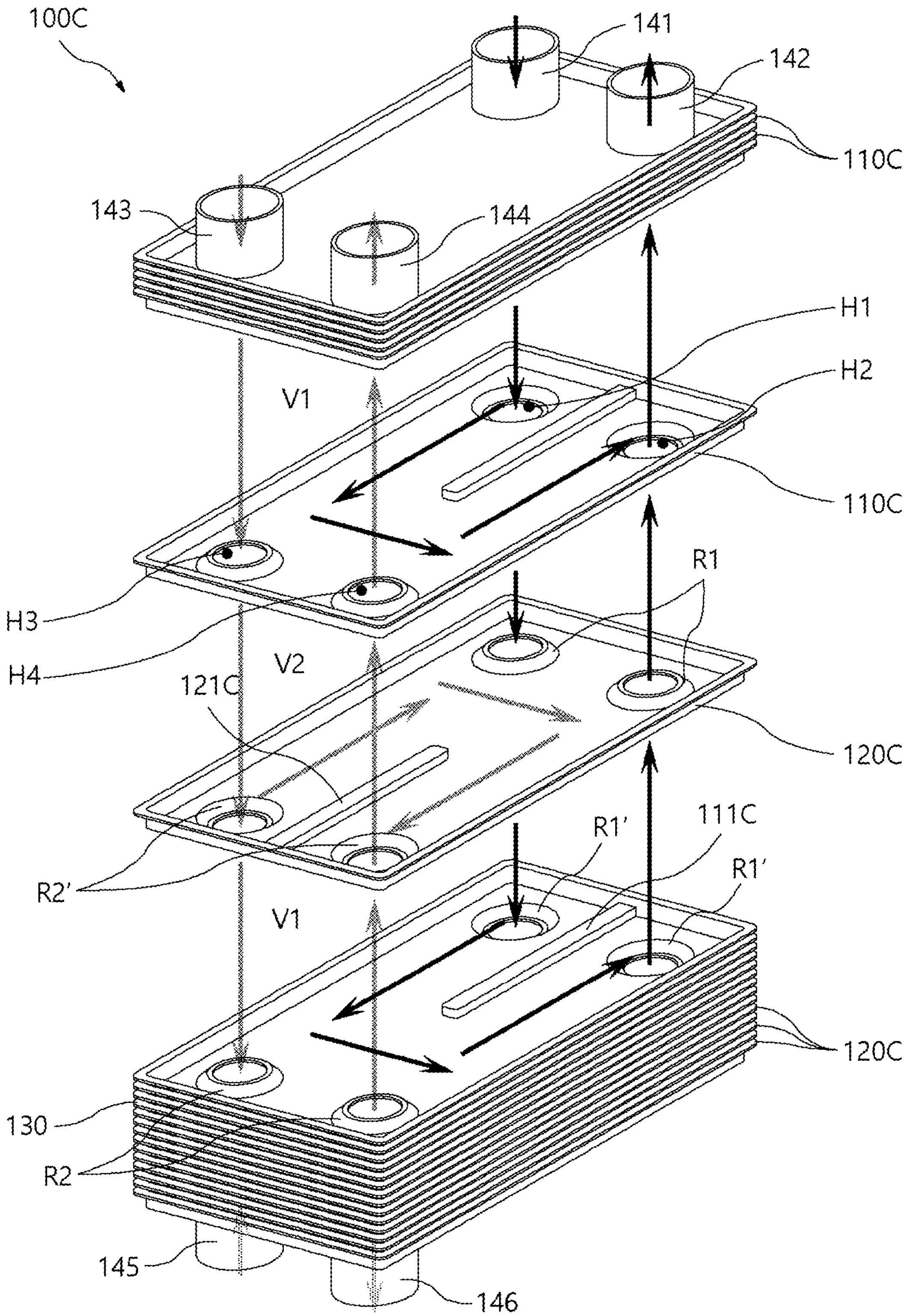
FIG. 19 is an exploded perspective view of first and third fluid sides of the heat exchanger according to a third embodiment of the present invention.
Figure 20:
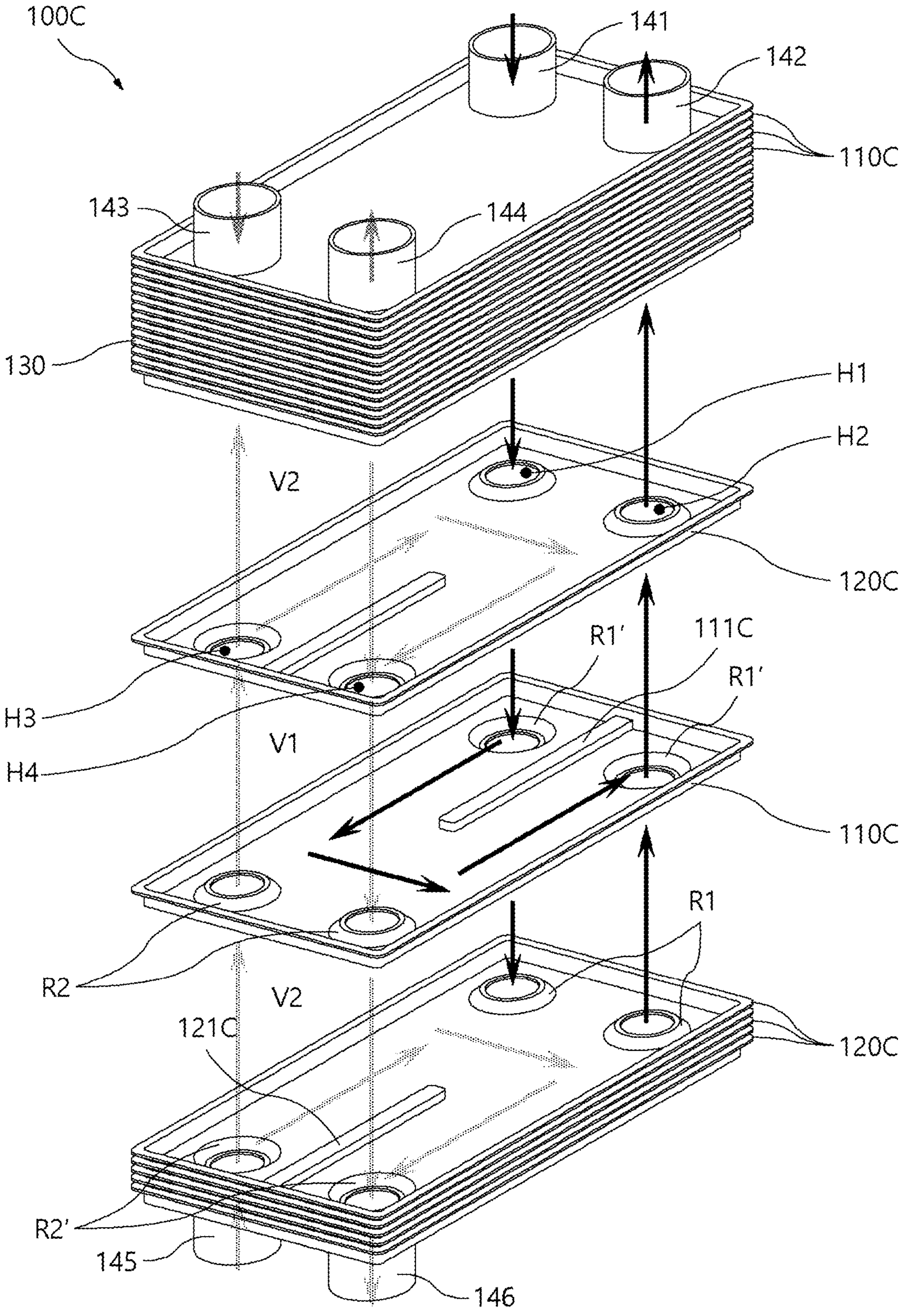
FIG. 20 is an exploded perspective view of second and third fluid sides of the heat exchanger according to the third embodiment of the present invention.
Figure 21:
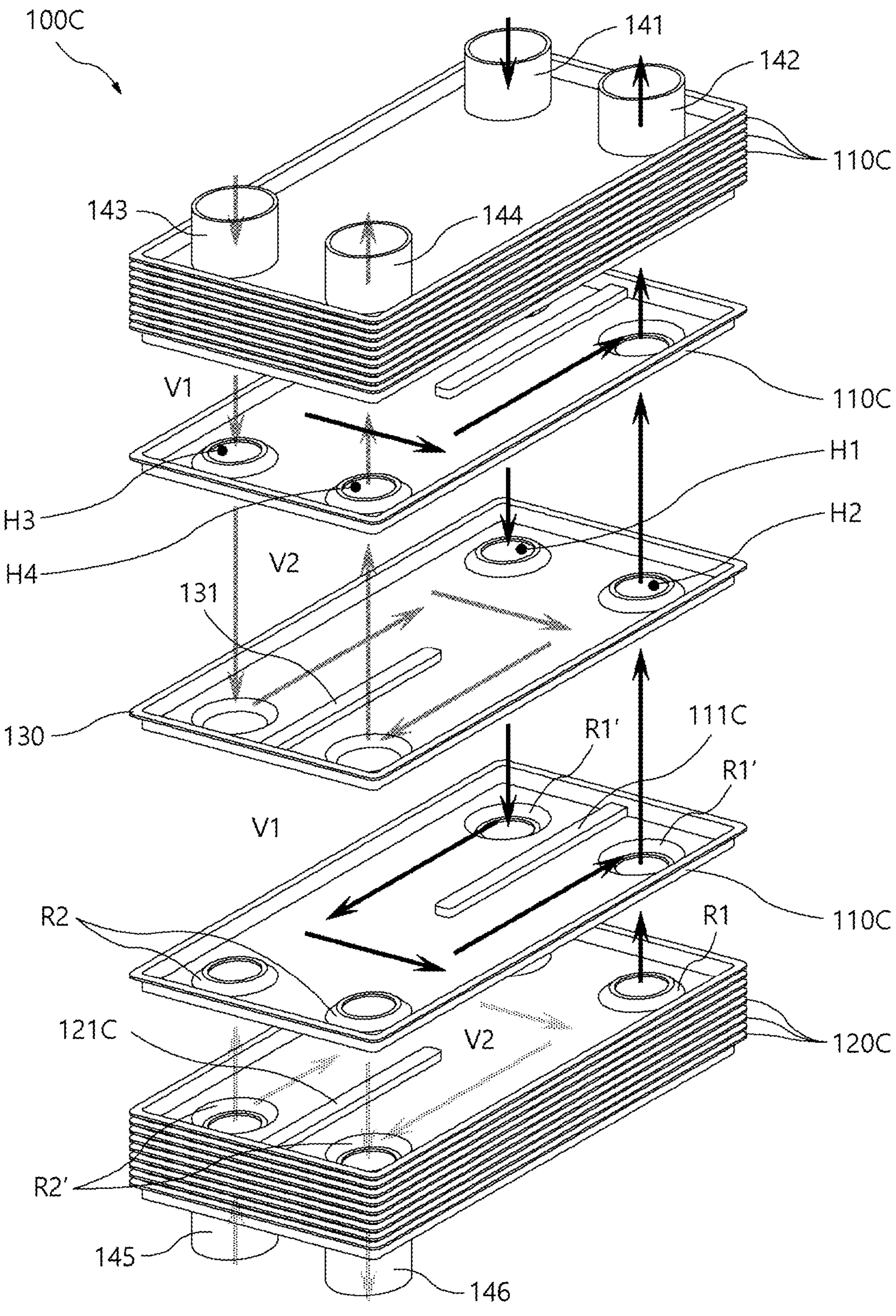
FIG. 21 is an exploded perspective view of a diaphragm side of the heat exchanger according to the third embodiment of the present invention.
Figure 22:
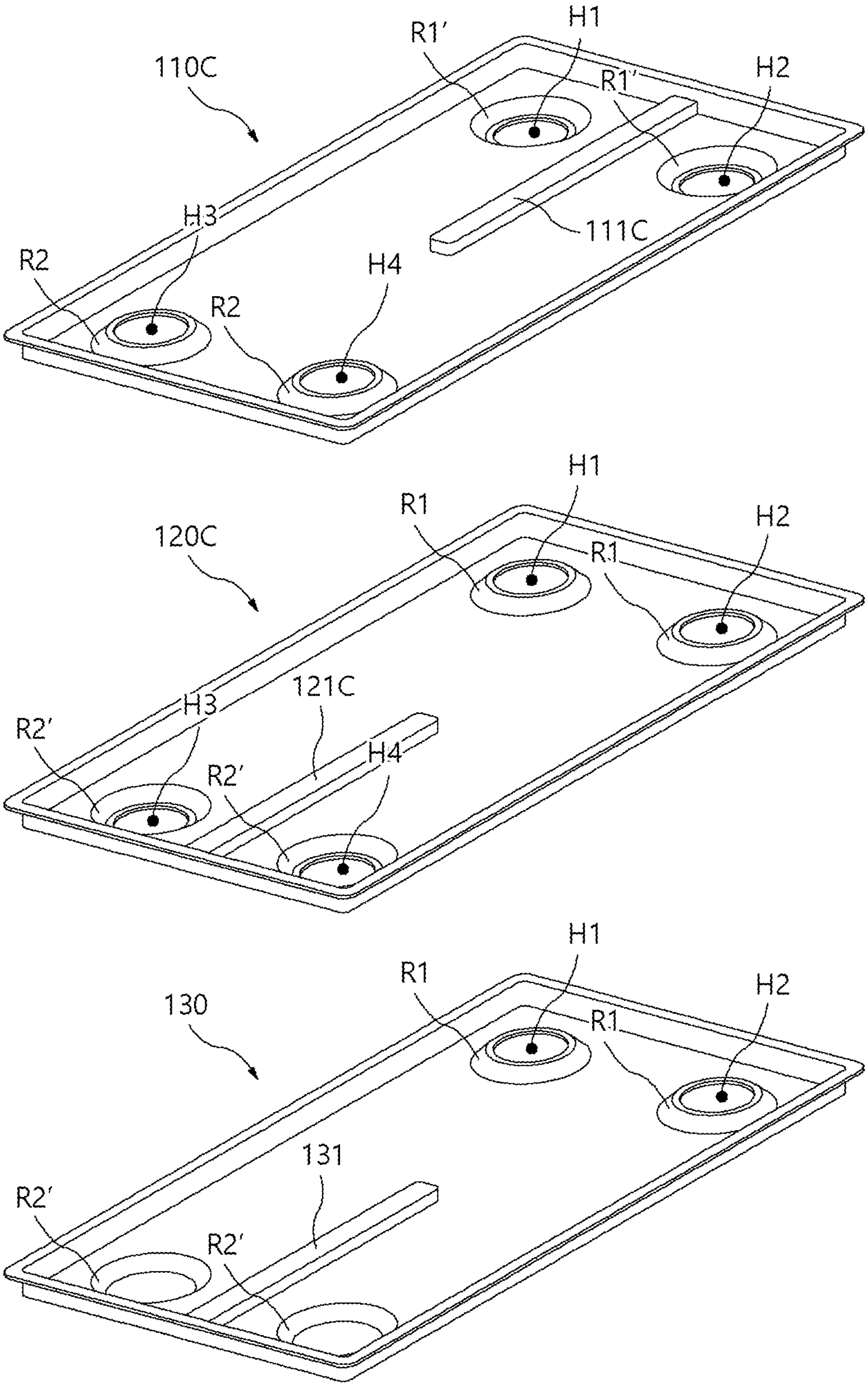
FIG. 22 shows the first and second plates and diaphragm plate of the heat exchanger according to the third embodiment of the present invention.

FIG. 19 is an exploded perspective view of first and third fluid sides of the heat exchanger according to a third embodiment of the present invention, FIG. 20 is an exploded perspective view of second and third fluid sides of the heat exchanger according to the third embodiment of the present invention, and FIG. 21 is an exploded perspective view of a diaphragm side of the heat exchanger according to the third embodiment of the present invention. FIG. 22 separately shows the first and second plates and diaphragm plate of the heat exchanger according to the third embodiment of the present invention. The description describes the heat exchanger according to the third embodiment of the present invention, in particular, a specific configuration of the plate in detail with reference to these drawings.

As shown in FIGS. 19 to 22, the plates in the third embodiment may include three types of the first plate 110C, the second plate 120C, and the diaphragm plate 130.

In the first plate 110C, the first junction part R1' may protrude downward from the circumference of the first inlet hole H1 and that of the first outlet hole H2, and the second junction part R2 may protrude upward from the circumference of the second inlet hole H3 and the second outlet hole H4. Accordingly, in the fluid flow space in the upper side of the first plate 110C, the second junction part R2 and the second junction part R2' protruding downward from the adjacent plate may be joined to each other to thus close the circulation of the second or third fluid, and the fluid flow space may thus form the first flow part V1 through which the first fluid circulates.

In the second plate 120C, the first junction part R1 may protrude upward from the circumference of the first inlet hole H1 and that of the first outlet hole H2, and the second junction part R2' may protrude downward from the circumference of the second inlet hole H3 and the second outlet hole H4. Accordingly, in the fluid flow space in the upper side of the second plate 120C, the first junction part R1 and the first junction part R1' protruding downward from the adjacent plate may be joined to each other to thus close the circulation of the first fluid, and the fluid flow space may thus form the second flow part V2 through which the second fluid or the third fluid circulates.

In the heat exchanger 100C according to the third embodiment, the first plate 110C and the second plate 110B may be alternately stacked in the height direction. Here, the heat exchanger 100C may further include the diaphragm plate 130 replacing the second plate 120C and disposed between the second fluid region M1 and the third fluid region M2. The diaphragm plate 130 may be disposed by replacing the second plate 120C, and basically have almost the same structure as that of the second plate 120C. However, as explicitly shown in FIG. 22, the diaphragm plate 130 may have a structure in which the second inlet hole H3 and the second outlet hole H4 are closed by a diaphragm in the structure of the second plate 120C. Accordingly, as explicitly shown in FIG. 21, the second or third fluid is unable to circulate through the upper and lower sides of the diaphragm plate 130. That is, in the heat exchanger 100C according to the third embodiment, the second fluid region M1 and the third fluid region M2 may be partitioned from each other in the height direction by the diaphragm plate 130.

In addition, (similar to the guide walls of the first embodiment described above,) the first plate 110C, the second plate 120C, and the diaphragm 130 may respectively include a first guide wall 111C, a second guide wall 121C, and a diaphragm 131 for the fluid to more smoothly circulate therein. Each guide wall may serve an almost similar role. For clarity, each guide wall is described in detail as follows.

The first guide wall 111C may extend in the length direction from one side wall of the first plate 110C to the middle to partition the first inlet hole H1 and the first outlet hole H2 in the first plate 110C from each other. In addition, the first guide wall 111C may protrude upward for its upper surface to be in contact with a bottom surface of the adjacent upper plate. Accordingly, the first flow part V1 may include a fluid path in which the first fluid introduced from one side through the first inlet hole H1 is guided to the other side by the first guide wall 111C and circulate, and guided from the other side to one side by the first guide wall 111C and discharged through the first outlet hole H2.

The second guide wall 121C may extend in the length direction from the other side wall of the second plate 120C to the middle to partition the second inlet hole H3 and the second outlet hole H4 in the second plate 120C from each other. In addition, the second guide wall 121C may protrude upward for its upper surface to be in contact with a bottom surface of the adjacent upper plate. Accordingly, the second flow part V2 may include a fluid path in which the second fluid or the third fluid, introduced from the other side through the second inlet hole H3 is guided to one side by the second guide wall 121C and circulate, and guided from one side to the other side by the second guide wall 121C and discharged through the second outlet hole H4.

The diaphragm guide wall 131 may have substantially the same structure as the second guide wall 121C. However, for clarity, the diaphragm guide wall 131 is described again as follows. The diaphragm guide wall 131 may extend from the other side wall of the diaphragm plate 130 to the middle in the length direction to partition the position of the second inlet hole H3 and the position of the second outlet hole H4 in the diaphragm plate 130 from each other. In addition, the diaphragm guide wall 131 may protrude upward for its upper surface to be in contact with a bottom surface of the adjacent upper plate.

The second inlet hole H3 and the second outlet hole H4 may not be formed in the diaphragm plate 130, and formed in adjacent plates. Therefore, one of the second fluid and the third fluid (e.g., second fluid in the example of FIG. 21) may flow into the fluid flow space of the diaphragm plate 130 through the second inlet hole H3 and the second outlet hole H4 in the adjacent plates. That is, as a result, the fluid flow space of the diaphragm plate 130 may form the second flow part V2 (even though the second inlet hole H3 and the second outlet hole H4 are blocked by the diaphragm). Accordingly, the second flow part V2 formed in the diaphragm plate 130 may include a fluid path in which the second fluid or the third fluid, introduced from the other side through the second inlet hole H3 in the adjacent plate is guided to one side by the second guide wall 121C and circulate, and guided from one side to the other side by the second guide wall 121C and discharged through the second outlet hole H4 in the adjacent plate.

The present invention is not limited to the above-described embodiments, and may be variously applied. In addition, the present invention may be variously modified by those skilled in the art to which the present invention pertains without departing from the gist of the present invention claimed in the claims.

INDUSTRIAL APPLICABILITY

According to the present invention, two different types of fluids and one other type of fluid may exchange heat with each other, that is, as a result, three types of fluids may exchange heat with each other by means of one heat exchanger. In particular, this structure may be used as a chiller for an electric vehicle to maximize its utilization.

The invention claimed is:

1. A plate heat exchanger formed by stacking a plurality of plates, the plate heat exchanger comprising:

one or more first plates, each comprising:

at least one inlet hole configured to receive a first fluid, at least one outlet hole configured to discharge the first fluid, and a fluid distribution structure comprising one or more protrusions configured to distribute fluid that flows from the inlet hole to the outlet hole across the plates, wherein the first inlet hole and the first outlet hole are disposed at opposite ends of the one or more first plates; and one or more second plates, each comprising a partition wall dividing the one or more second plates into a first side and a second side such that a second fluid can flow through the first side and a third fluid can flow through the second side with the second fluid isolated from the third fluid, wherein the one or more first plates and the one or more second plates are alternately stacked.

2. The plate heat exchanger of claim 1, wherein the fluid distribution structure becomes smaller closer to the first inlet hole or the first outlet hole.

3. The plate heat exchanger of claim 2, wherein the fluid distribution structure has a triangular shape or a circular arc shape.

4. The plate heat exchanger of claim 1, wherein the fluid distribution structure is spaced apart from the partition wall.

5. The plate heat exchanger of claim 1, wherein, for at least one of the one or more first plates, the inlet hole and the outlet hole are each disposed at a center of a respective side of the one or more first plates.

6. The plate heat exchanger of claim 1, further comprising a second inlet hole and a second outlet hole through which the second fluid is received and discharged, respectively, and a third inlet hole and a third outlet hole through which the third fluid is received and discharged, respectively, and wherein the second inlet hole and the second outlet hole are each disposed at each corner of a respective side of the one or more first plates and the third inlet hole and the third outlet hole are each disposed at each corner of the opposing side of the one or more first plates.

7. The plate heat exchanger of claim 6, wherein the fluid distribution structure is a pair of ribs positioned on a center of the one or more first plates, the ribs having a half-moon shape in which a side of the pair of ribs adjacent to the first inlet hole or the first outlet hole is a circular arc, and a central side of the pair of ribs is a straight line, and spaced apart from the partition wall positioned on the adjacent one or more second plates.

8. The plate heat exchanger of claim 6, further comprising:

a first guide wall extending from one side wall of the one or more second plates to partition from each other the second inlet hole and the second outlet hole, and a second guide wall extending from another side wall of the one or more second plates to partition from each other the third inlet hole and the third outlet hole.

9. The plate heat exchanger of claim 1, further comprising:

a second inlet hole and a second outlet hole through which the second fluid is introduced and discharged, respectively, and a third inlet hole and a third outlet hole through which the third fluid is introduced and discharged, respectively, and wherein the second inlet hole and the second outlet hole are each disposed at each corner of a respective side of the one or more first plates and the third inlet hole and the third outlet hole are each disposed at each corner of the opposing side of the one or more first plates.

10. The plate heat exchanger of claim 9, wherein the fluid distribution structure is a pair of ribs positioned adjacent to the first inlet hole or the first outlet hole, the ribs having a triangular shape in which its side adjacent to the first inlet hole or the first outlet hole is a vertex and its central side is a straight line.

11. The plate heat exchanger of claim 9, further comprising:

a first guide wall extending from the partition wall to separate the second inlet hole and the second outlet hole in the one or more second plates from each other, and a second guide wall extending from the partition wall to separate the third inlet hole and the third outlet hole in the one or more second plates from each other.

12. The plate heat exchanger of claim 1, further comprising a plurality of beads arranged on the one or more first plates and the one or more second plates.

13. The plate heat exchanger of claim 12, wherein the bead density of the plurality of beads on the one or more first plates is lower than the bead density on the one or more second plates.

14. The plate heat exchanger of claim 12, wherein the plurality of beads arranged on the one or more first plates and the plurality of beads arranged on the one or more second plates are misaligned with each other.

15. The plate heat exchanger of claim 1, further comprising a first inlet hole and a first outlet hole through which the first fluid is introduced and discharged, respectively, and the first inlet hole and the first outlet hole are positioned in one side partitioned by the partition wall.

16. A plate heat exchanger, formed by stacking a plurality of plates, the plate heat exchanger comprising:

one or more first plates, each comprising:

at least one inlet hole configured to receive a first fluid, at least one outlet hole configured to discharge the first fluid, and a fluid distribution structure comprising one or more protrusions configured to distribute fluid that flows from the inlet hole to the outlet hole across the one or more first plates, wherein the first inlet hole and the first outlet hole are disposed at opposite ends of the one or more first plates; and one or more second plates, each comprising a partition wall dividing the second plates into a first side and a second side such that a second fluid can flow through the first side and a third fluid can flow through the second side with the second fluid isolated from the third fluid, wherein the one or more first plates and the one or more second plates are alternately stacked, and wherein the partition wall has at least one partition wall hole.

* * * * *